(12) United States Patent
Terai et al.

(10) Patent No.: US 7,752,295 B2
(45) Date of Patent: Jul. 6, 2010

(54) APPARATUS FOR AIDING CONSTRUCTION OF STORAGE AREA NETWORK SYSTEM AND METHOD THEREFOR

(75) Inventors: Sachiko Terai, Kawasaki (JP); Sawao Iwatani, Kawasaki (JP); Hideyuki Tanaka, Kawasaki (JP); Shigeru Honmura, Kato (JP); Noriaki Matsuzaki, Kato (JP); Yasushi Kisimoto, Kato (JP); Fumikazu Fujimoto, Kato (JP); Kenichi Matsumoto, Kato (JP); Hiroki Ohashi, Kato (JP); Hideaki Hasegawa, Kato (JP); Keiko Usunaga, Kato (JP); Soichi Takeuchi, Kato (JP)

(73) Assignee: Fujitsu Limited, Kawasaki (JP)

( * ) Notice: Subject to any disclaimer, the term of this patent is extended or adjusted under 35 U.S.C. 154(b) by 1072 days.

(21) Appl. No.: 10/952,763

(22) Filed: Sep. 30, 2004

(65) Prior Publication Data

US 2005/0055428 A1 Mar. 10, 2005

Related U.S. Application Data

(63) Continuation of application No. PCT/JP03/04366, filed on Apr. 4, 2003.

(30) Foreign Application Priority Data

Apr. 4, 2002 (JP) .............................. 2002-102974

(51) Int. Cl.
*G06F 15/173* (2006.01)
*G06F 15/177* (2006.01)
(52) U.S. Cl. ....................................... 709/223; 715/734

(58) Field of Classification Search ................. 709/221, 709/223, 238
See application file for complete search history.

(56) References Cited

U.S. PATENT DOCUMENTS 6,003,137 A 12/1999 Kawasaki (Continued)

FOREIGN PATENT DOCUMENTS

EP 0 490 624 A2 6/1992

(Continued)

OTHER PUBLICATIONS

European Patent Office Communication, mailed Nov. 13, 2007 and issued in corresponding European Patent Application No. 03 745 928.6-1525.

(Continued)

*Primary Examiner*—Benjamin R Bruckart
(74) *Attorney, Agent, or Firm*—Staas & Halsey LLP

(57) ABSTRACT

When information on a device such as a server, storage, and an FC switch constituting a SNA system is input, these devices are displayed and arranged properly on a screen (S1, S2). When information on a physical path is input by a designer by using this display screen, a virtual SAN system in which the devices are connected by a fiber channel is displayed on the screen (S3). Furthermore, when information on an access path is input by the designer by using the construction image, the access path is additionally displayed on the construction image of the virtual SAN system (S5). Since the construction image of the virtual SAN system is displayed on the screen, the designer can easily create a design drawing while visually checking the SAN system. This can reduce the work load and time required for construction of the SAN system.

5 Claims, 19 Drawing Sheets

U.S. PATENT DOCUMENTS

| | | |
|---|---|---|
| 6,671,776 B1 | 12/2003 | DeKoning |
| 6,772,204 B1 | 8/2004 | Hansen |
| 6,839,747 B1 | 1/2005 | Blumenau et al. |
| 7,003,567 B2 | 2/2006 | Suzuki et al. |
| 7,062,642 B1 * | 6/2006 | Langrind et al. ............ 709/223 |
| 7,251,221 B2 * | 7/2007 | Wall et al. .................... 370/254 |
| 2001/0054093 A1 | 12/2001 | Iwatani |
| 2002/0133671 A1 | 9/2002 | Obara et al. |
| 2002/0194426 A1 | 12/2002 | Obara et al. |
| 2003/0055932 A1 | 3/2003 | Brisse |
| 2003/0085914 A1 * | 5/2003 | Takaoka et al. ............. 345/734 |
| 2003/0088733 A1 | 5/2003 | Obara et al. |
| 2003/0108055 A1 * | 6/2003 | Damon et al. ............... 370/401 |
| 2003/0182422 A1 * | 9/2003 | Bradshaw et al. ........... 709/225 |
| 2003/0196037 A1 | 10/2003 | Obara et al. |

FOREIGN PATENT DOCUMENTS

| | | |
|---|---|---|
| EP | 0 964 546 | 12/1999 |
| JP | 04-304510 | 10/1992 |
| JP | 06-029989 | 2/1994 |
| JP | 6-29989 | 2/1994 |
| JP | 8-44646 | 2/1996 |
| JP | 8-50540 | 2/1996 |
| JP | 08-050540 | 2/1996 |
| JP | 08-056232 | 2/1996 |
| JP | 08-129497 | 5/1996 |
| JP | 10-187428 | 7/1998 |
| JP | 10-257130 | 9/1998 |
| JP | 11-296313 | 10/1999 |
| JP | 2000-322354 | 11/2000 |
| JP | 2001-344190 | 12/2001 |
| JP | 2002-063063 | 2/2002 |
| JP | 2002-63063 | 2/2002 |
| WO | 01/14987 A2 | 3/2001 |
| WO | 01/80013 A1 | 10/2001 |
| WO | 01/98930 | 12/2001 |
| WO | 01/98930 A2 | 12/2001 |

OTHER PUBLICATIONS

U.S. Patent and Trademark Office Action, mailed Nov. 13, 2006 and issued in related U.S. Appl. No. 10/270,131.
Partial European Search Report for European Patent Application No. 07000923.8-1525, mailed May 11, 2007.
Japanese Patent Office Notice of Rejection Grounds, mailed Apr. 17, 2007 and issued in corresponding Japanese Patent Application No. 2003-582958.
European Search Report received on Jul. 11, 2007 issued in corresponding European patent application No. 07000923.8.
Japanese Office Action for Japanese Application No. 2003-582958; mailed Apr. 15, 2008.
Extended European Search Report for European Application No. 08004417.5-1525; dated Jun. 26, 2008.
European Patent Office Communication mailed Dec. 29, 2008 for corresponding European Patent Application No. 07000923.8.
Japanese Office Action mailed Feb. 23, 2010 for corresponding Japanese Patent Application No. 2007-159043.

* cited by examiner

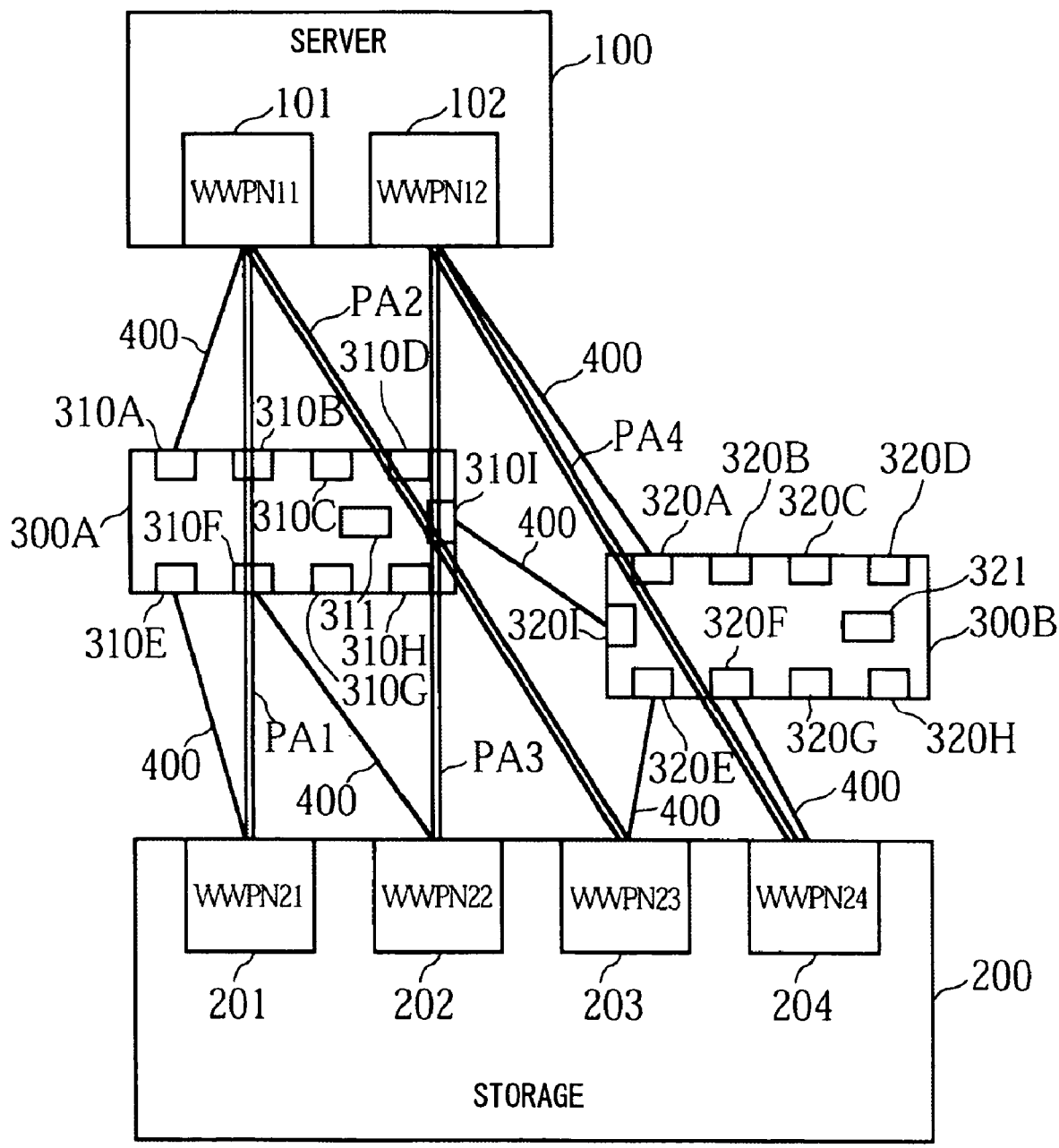
F I G. 1

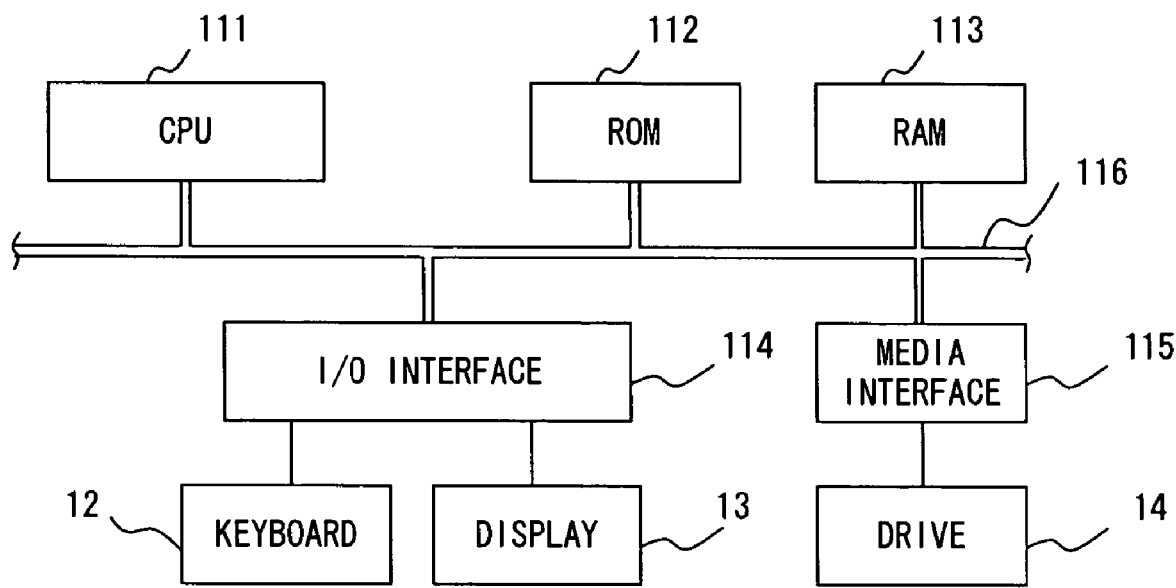
F I G. 3

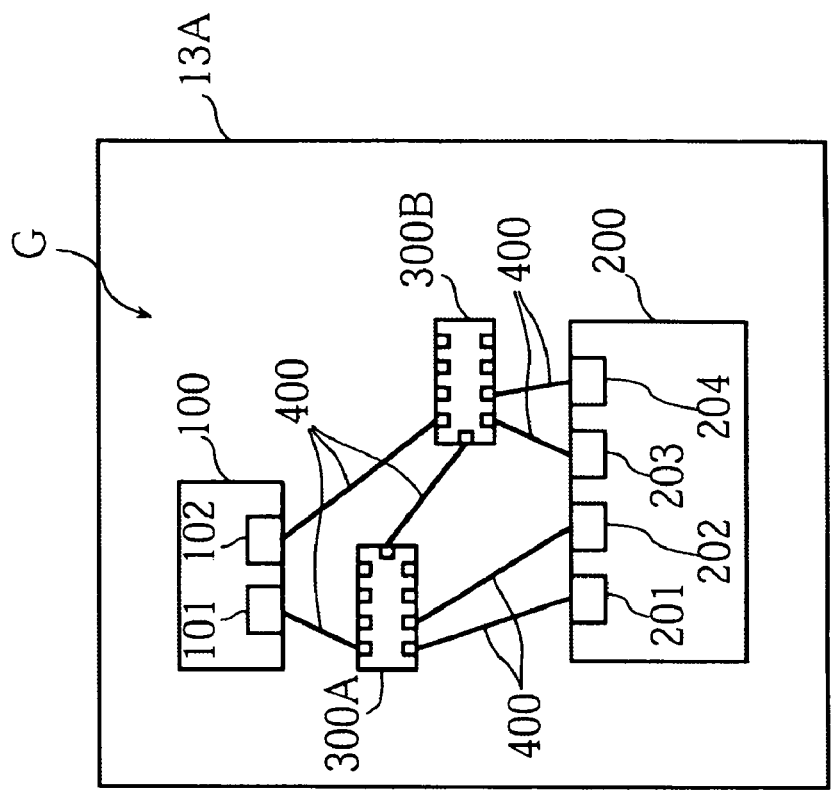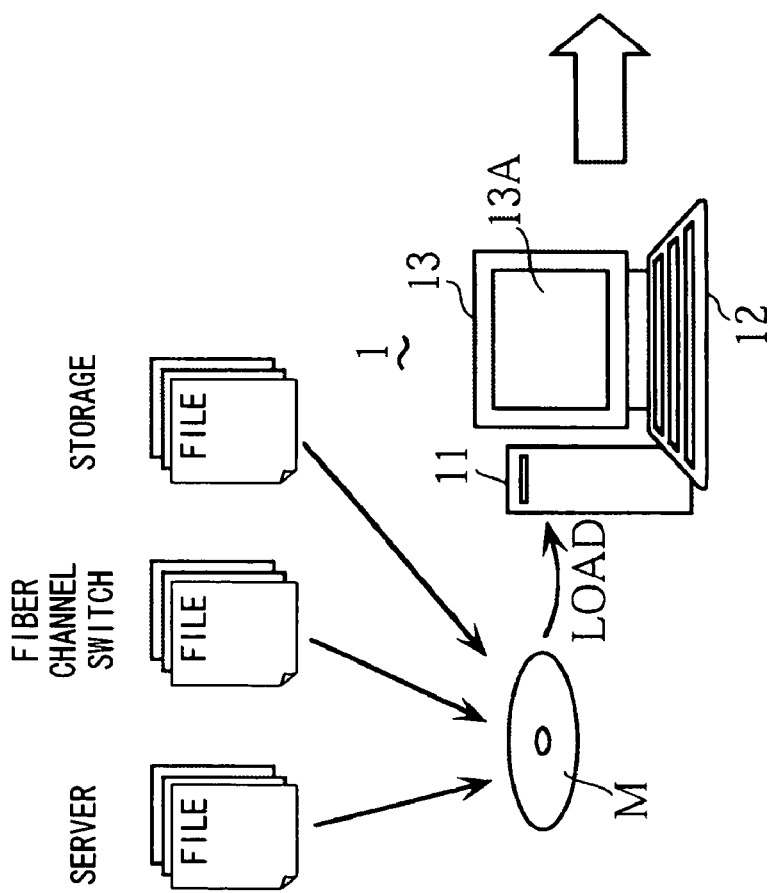
FIG. 4

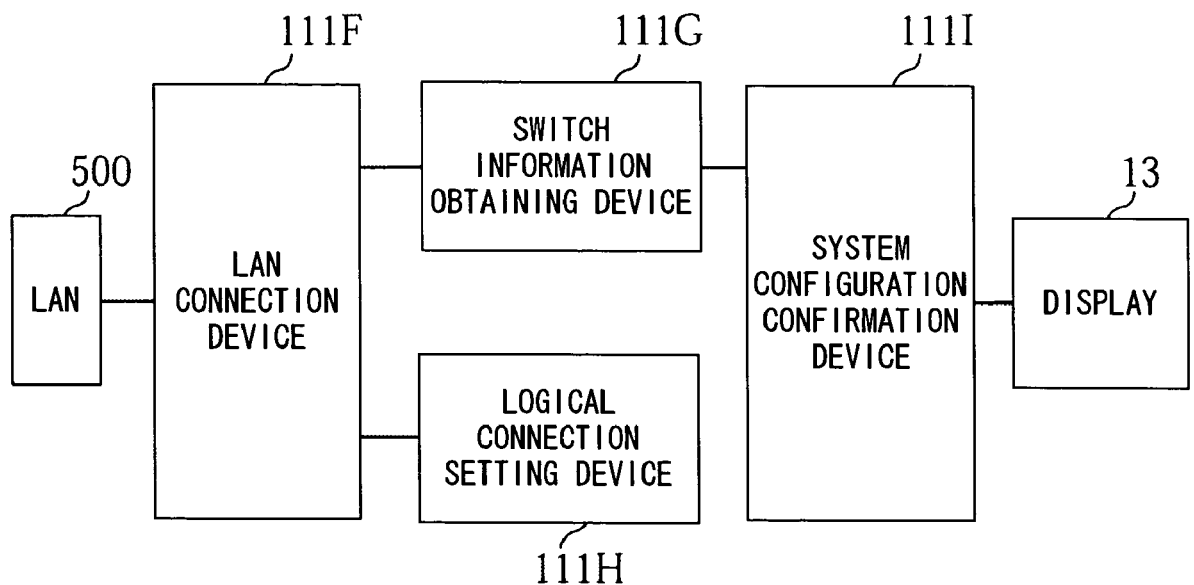
F I G. 1 2

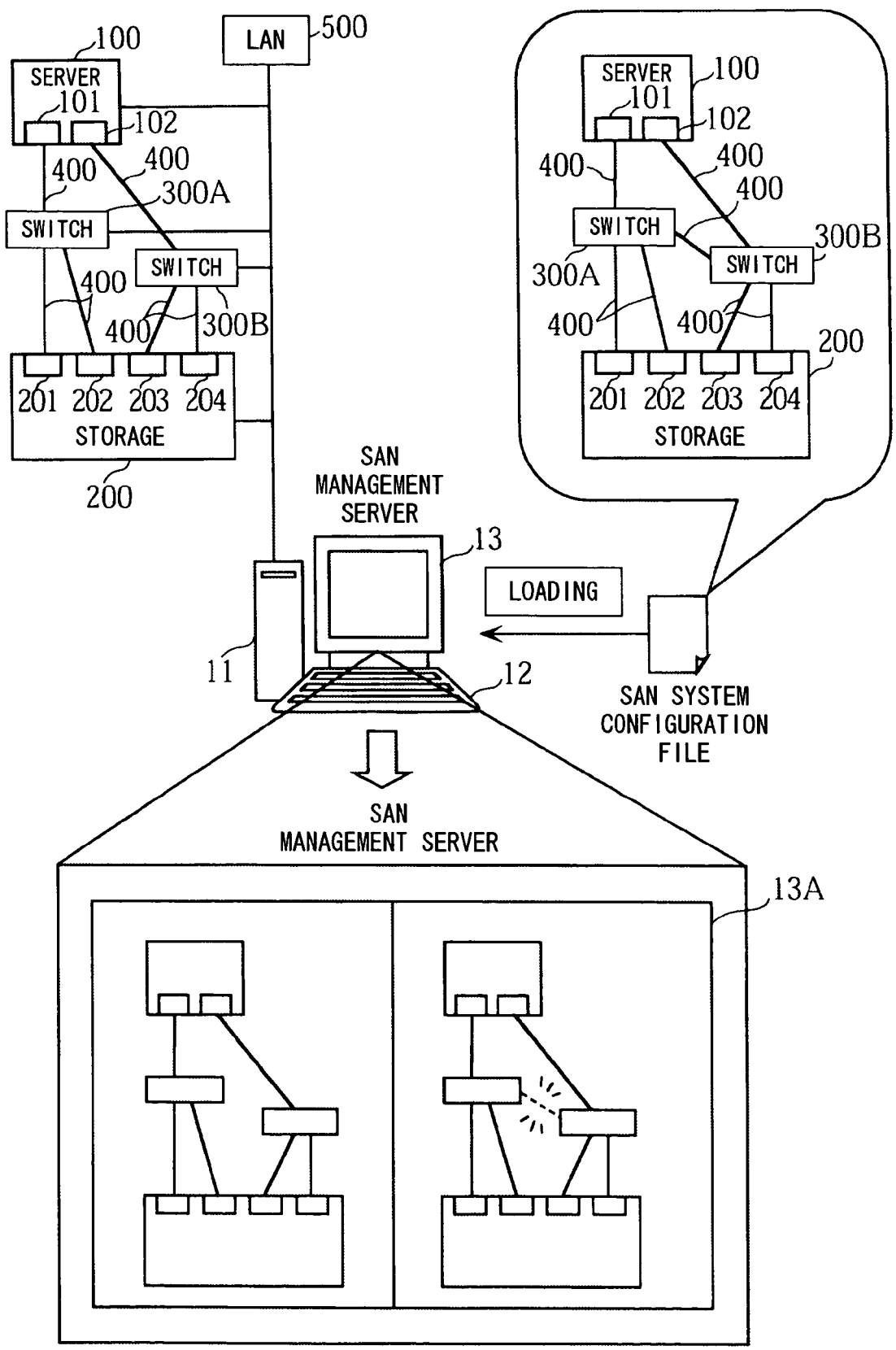
F I G. 15

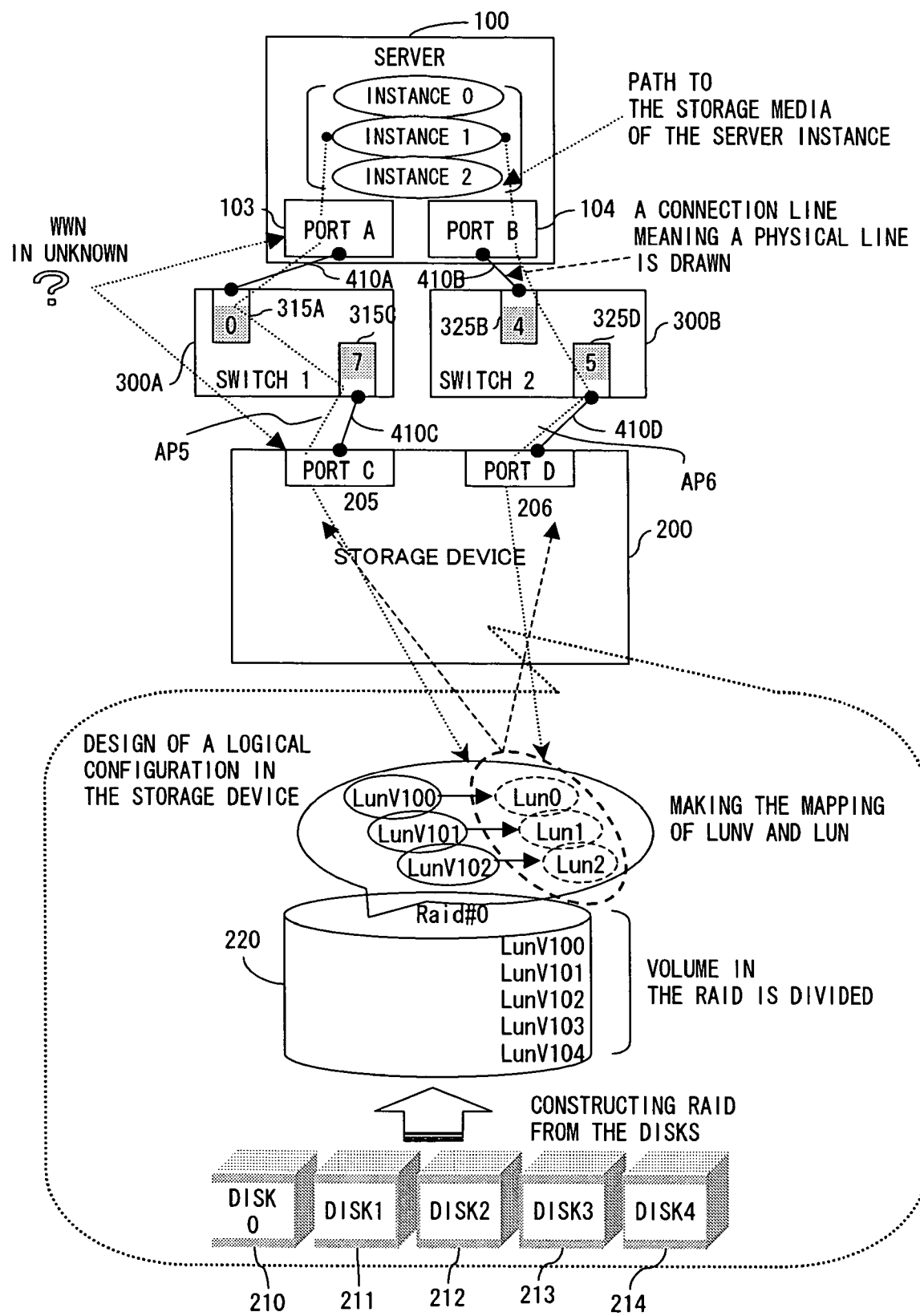
F I G. 16

| NAMES OF DEVICES IN THE SERVER | MULTI-PATH INFORMATION ||| MEDIA INFORMATION |
|---|---|---|---|---|
| | SERVER FC PORT | SWITCH | STORAGE FC PORT | |
| INSTANCE 0 | PORT A : ?<br>PORT B : ? | SWITCH 1<br>PORT 0 TO PORT 7<br>SWITCH 2<br>PORT 4 TO PORT 5 | PORT C : ?<br>PORT D : ? | LUN0 (STORAGE) |
| INSTANCE 1 | ^ | ^ | ^ | LUN1 (STORAGE) |
| INSTANCE 2 | ^ | ^ | ^ | LUN2 (STORAGE) |

FIG. 17

| NAMES OF DEVICES IN THE SERVER | MULTI-PATH INFORMATION | | | MEDIA INFORMATION |
|---|---|---|---|---|
| | SERVER FC PORT | SWITCH | STORAGE FC PORT | |
| INSTANCE 0 | PORT A : WWN1<br>PORT B : WWN2 | SWITCH 1<br>PORT A TO PORT C<br>(WWN1) (WWN3)<br>SWITCH 2<br>PORT B TO PORT 0<br>(WWN2) (WWN4) | PORT C : WWN3<br>PORT D : WWN4 | LUN0 (STORAGE) |
| INSTANCE 1 | | | | LUN1 (STORAGE) |
| INSTANCE 2 | | | | LUN2 (STORAGE) |

FIG. 19

APPARATUS FOR AIDING CONSTRUCTION OF STORAGE AREA NETWORK SYSTEM AND METHOD THEREFOR

CROSS REFERENCE TO RELATED APPLICATION

This application is a continuation of international PCT application NO. PCT/JP/03/04366 filed on Apr. 4, 2003 and published as WO 03/085894 A1 on Oct. 16, 2003.

BACKGROUND OF THE INVENTION

1. Field of the Invention

The present invention relates to a storage area network system (hereinafter referred to as "SAN system") construction aid apparatus, a SAN system construction aid method and a SAN system construction aid program which reduce time, labor, cost and the like required when a SAN system is constructed.

2. Description of the Related Art

A lot of methods for managing and controlling the configuration of a computer system have been disclosed (for example, patent document 1, patent document 2, patent document 3 and patent document 4). Disclosed in patent document 1 is a system which aids the design of the application configuration of a calculator in a client and server system, and the use of this system enables an operator who does not know the restrictions pertaining to the constituents of the system between a client and a server to design the configuration of a client and server system, and enables him to conduct this work efficiently.

In recent years, in a network comprising a plurality of storages and a plurality of servers connected by a LAN (Local Area Network), a SAN system which makes it possible to reduce TCO (Total Cost of Ownership) by integrating a plurality of storages which each server uses and managing them on the basis of a single principle has been widely spreading.

This SAN system connects a server and a storage by the fabric method using, for example, a fiber channel and a fiber channel switch, in a channel different from a LAN, makes high-speed access from the server to the storage possible, and makes it possible to manage a plurality of storages distributed on the basis of a single principle by dynamically connecting the server and the storage.

FIG. 1 shows the basic configuration of the SAN system. In order to simplify the description, FIG. 1 shows the SAN system which connects one set of server 100 and one set of storage 200 by the fabric method using two sets of fiber channel switch (hereinafter referred to as "FC switch") 300A and 300B and a fiber channel 400 using seven optical fibers.

The server 100 has two fiber channel ports 101 and 102 (hereinafter referred to as "FC port") to which the fiber channel 400 is connected, and the storage 200 has four FC ports 201, 202, 203 and 204. The two FC switches 300A and 300B have FC ports 310A to 310H and 320A to 320H respectively as well as FC ports 310I and 320I to cascade-connect the FC switches.

The FC port 310I of the FC switch 300A and the FC port 320I of FC switch 300B are cascade-connected by the fiber channel 400, and the FC port 101 and FC port 102 of the server 100, the FC ports 201 to 204 of the storage 200, and the FC ports 310A to 310H and 320A to 320H of the FC switches 300A and 300B respectively are connected to
FC port 101—FC port 310A
FC port 102—FC port 320A
FC port 310E—FC port 201
FC port 310F—FC port 202
FC port 320E—FC port 203
FC port 320F—FC port 204
by the fiber channel 400.

In a fiber channel, an inherent ID code of world wide port name (hereinafter referred to as "WWPN") as a given format configuration is set to FC ports. The FC switch has a zoning function (access control function) for dividing the connection relationship between the FC port of the server side and the FC port of the storage side using the WWPN peculiar to the FC port, and this zoning function dynamically controls the connection of the FC port of the server side and the FC port of the storage side.

The FC switches 300A and 300B are equipped with the zoning mechanisms 311 and 321 which fulfill the zoning function. In the construction of a SAN system, the zone division information which indicates the connection relationship between the zoning mechanisms 311 and 321 and the FC ports 101 and 102 of the server 100, the FC ports 201 to 204 of the storage 200 is set, and a logical connection path (hereinafter referred to as "access path") between the FC ports 101 and 102 of the server 100 which makes access possible and the FC ports 201 to 204 of the storage 200 is set.

In FIG. 1, when the WWPN of the FC ports 101 and 102 of the server 100 is WWPN11 and WWPN12, the WWPN of the FC ports 201, 202, 203 and 204 of the storage 200 is WWPN21, WWPN22, WWPN23 and WWPN24, the FC switch 300A and the FC switch 300B are cascade-connected, so that these switches share the zones, and zone A (WWPN11, WWPN21), zone B (WWPN11, WWPN23), zone C (WWPN12, WWPN22) and zone D (WWPN12, WWPN24) are set by the zoning mechanisms 311 and 321.

Therefore, in the SAN system shown in FIG. 1, four access paths AP1 to AP4 i.e.
AP1: FC port 101—FC port 210
AP2: FC port 101—FC port 203
AP3: FC port 102—FC port 202
AP4: FC port 102—FC port 204 are set between the server 100 and the storage 200.

When a SAN system is actually constructed, it is necessary to set the access path of the SAN system by determining the type and quantity of each device constituting the SAN system such as a server, a storage and an FC switch, physically connecting each server and each FC switch, and each storage and each FC switch by a fiber channel, and setting the zoning of each FC switch.

When a SAN system was actually constructed in the past, a client determined the type and quantity of each device constituting the SAN system such as a server, a storage and an FC switch, made a block diagram of the SAN system in advance, physically connected each server and each FC switch, and each storage and each FC switch by a fiber channel based on this block diagram, and then set an access path to the constructed SAN system using, for example, the software for SAN management.

After the client constructed the SAN system, he used to check through visual inspection whether the configuration of the SAN system conformed to the SAN system block diagram he made in advance.

Patent document 1: Kokai (Jpn. unexamined patent publication) No. 10-187428 (pages 1 to 8, FIGS. 1 to 26)
Patent document 2: Kokai (Jpn. unexamined patent publication) No. 4-304510 (pages 1 to 3, FIGS. 1 to 5)
Patent document 3: Kokai (Jpn. unexamined patent publication) No. 8-562232 (pages 1 to 7, FIGS. 1 to 11)
Patent document 4: Kokai (Jpn. unexamined patent publication) No. 8-129497 (pages 1 to 15, FIGS. 1 to 37)

In the conventional method of constructing a SAN system, it was not possible to check through visual inspection what configuration the SAN system under consideration would become like before introducing the SAN system, so there was a problem in that the load for designing the system was huge, a long time was required, and the cost for introducing the SAN system was high.

In the conventional method of constructing a SAN system, it was necessary to set an access path after building the SAN system actually, so there was a problem in that a lot of time and labor were required to set the access path in a large-scale SAN system and that errors in the work easily arose therefrom.

Moreover, there was another problem in that since it was checked through visual inspection whether the SAN system was constructed as designed after the SAN system was actually constructed, time was required for the checking, and a failure in checking was likely to occur easily.

In addition, the design of the SAN system has required, in recent years, a lot of know-how because of the complexity of its environment and its system contents. This makes the burden to be borne by a system engineer all the more large and makes errors occur easily, and man-hours including the processes of setting an actual system are huge.

Concretely speaking, first of all, it was necessary to grasp complex know-how in a preliminary system design.

Next, in the preliminary system design, it was necessary to confirm the information on WWNN (World Wide Node Name) and WWPN (World Wide Port Name) of actual devices (devices which actually constitute the SAN system) because there is information which can be confirmed only by the actual devices, such as a control number from a server to a storage. There was another problem in that there is a possibility that an error in the confirmed information and an input error arise.

There was also another problem in that in constructing the system in the site where the system is actually introduced, a lot of man-hours for setting an access path are required.

The present invention was worked out in view of the above problems, and the purpose of the present invention is to provide a SAN system construction aid apparatus, a SAN system construction aid method and a SAN system construction aid program which can reduce various burdens of work and time related to the construction of the SAN system and can further reduce TCO by making a computer virtually design the SAN system, directing the computer to display the result of the virtual design to make a visual design of the SAN system possible, and making the confirmation of the SAN system which is actually constructed using the design data possible.

The present invention makes man-hour reduction and automatic system setting in an installation site possible by performing system design in advance and automatically reading information necessary for constructing the system in the installation site from the actual apparatus and implementing the setting.

SUMMARY OF THE INVENTION

To solve the above problems, the following technical measures are taken in the present invention.

According to an embodiment of the present invention, A network construction aid apparatus in which at least one server having at least one port, at least one storage having at least one port, and at least one switch having a plurality of fiber channel ports are connected by a plurality of fiber channels, comprising: a first information input device for inputting information concerning each device of the server, the storage and the switch; a second information input device for inputting information concerning the connection by a plurality of fiber channels between the server, the storage and the fiber channel switch; an image making device for making a network configuration image from the network configuration information indicating that the server, the storage and the fiber channel switch are connected by a plurality of fiber channels based on the information inputted from the first and second information input devices; and a display device for displaying the network configuration imaged made by the image making device.

According to another embodiment of the present invention, A network construction aid method which uses a computer for constructing a network in which at least one server having at least one port, at least one storage having at least one port, and at least one switch having a plurality of ports are connected by a plurality of fiber channels, comprising: a first information input process of inputting information concerning each device of the server, the storage and the switch which constitute the network to the computer; a second information input process of inputting information concerning the connection between the server, the storage and the switch by a plurality of fiber channels; an image making process of making a configuration image of a network which is connected by a plurality of fiber channels between the server, the storage and the switch based on the information inputted in the first and second information input processes; and a display process of displaying the network configuration image made in the image making process.

According to another embodiment of the present invention, A computer data signal embodied in a carrier wave for constructing a network in which at least one server having at least one port, at least one storage having at least one port, and at least one switch having a plurality of ports are connected by a plurality of fiber channels, used to direct a computer to perform: a first information input process of inputting information concerning each device of the server, the storage and the switch; a second information input process of inputting information concerning the connection between the server, the storage and the fiber channel switch; an image making process of making a configuration image of a network which is connected by a plurality of fiber channels between the server, the storage and the switch based on the information inputted from the first and second information input processes; and a display process of displaying the imaged made in the image making process.

According to another embodiment of the present invention, A computer data signal embodied in a carrier wave for constructing a network in which at least one server having at least one port, at least one storage having at least one port, and at least one switch having a plurality of ports are connected by a plurality of fiber channels, used to direct a computer to perform: a provisional port information storage process of storing provisional port information before obtaining the inherent port information which the server, the storage and the switch have; and a port information replacement process of replacing the stored provisional port information by the inherent port information after obtaining inherent information of any two ports out of inherent information which the server, the storage and the switch have.

According to another embodiment of the present invention, A computer data signal embodied in a carrier wave for constructing a network in which at least one server having at least one port, at least one storage having at least one port, and at least one switch having a plurality of ports are connected by a plurality of fiber channels, used to direct a computer to perform: a storage process of storing the association information which associates the provisional port information of the switch with at least one out of the provisional port information of the server, the provisional port information of the storage and the provisional port information of the switch itself; an obtaining process of obtaining inherent port information which at least any two of the server, the storage and the switch have out of the inherent port information which these devices have; an updating process of updating the provisional information of the association information stored in the storage process to the inherent port information obtained in the obtaining process which corresponds to the provisional port information; and a reflection process of reflecting the association information updated in the updating process to at least one out of the server, the storage and the switch.

According to another embodiment of the present invention, A computer data signal embodied in a carrier wave for constructing a network in which at least one server having at least one port, at least one storage having at least one port, and at least one switch having a plurality of ports are connected by a plurality of fiber channels, used to direct a computer to perform: an access path making process of making the access path information which is the information of the access path between the server, the switch and the storage; and an access path setting process of setting the access path between the server, switch and the storage based on the access path information made in the access path making process.

According to another embodiment of the present invention, A network construction aid apparatus in which at least one server having at least one port, at least one storage having at least one port, and at least one switch having a plurality of ports are connected by a plurality of fiber channels, further comprising: a provisional port information storage means for storing the provisional port information corresponding to the information of any two ports out of the information concerning each port of the server, the storage and the switch; and a port information replacement means for replacing the stored provisional port information by the inherent port information corresponding to the provisional port information after obtaining inherent information of any two ports out of the inherent information concerning each port of the server, the storage and the switch.

According to another embodiment of the present invention, A network construction aid apparatus in which at least one server having at least one port, at least one storage having at least one port, and at least one switch having a plurality of ports are connected by a plurality of fiber channels, further comprising: a storage means for storing the association information which associates the provisional port information of the switch with at least one out of the provisional port information of the server, the provisional port information of the storage and the provisional port information of the switch itself; an obtaining means for obtaining inherent port information which at least any two of the server, the storage and the switch have out of the inherent port information which these devices have; an updating means for updating the provisional information of the association information stored by the storage device to the inherent port information obtained by the obtaining means for which corresponds to the provisional port information; and a reflection means for reflecting the association information updated by the updating means to at least one out of the server, the storage and the switch.

According to another embodiment of the present invention, A network construction aid apparatus in which at least one server having at least one port, at least one storage having at least one port, and at least one switch having a plurality of ports are connected by a plurality of fiber channels, further comprising: an access path making means for making the access path information which is the information of the access path between the server, the switch and the storage; and an access path setting means for setting the access path between the server, switch and the storage based on the access path information made by the access path making means.

According to another embodiment of the present invention, A network construction aid apparatus which comprises a first apparatus having at least one port, a second apparatus having at least one port, and a fiber channel connecting the port which the first apparatus has and the port which the second apparatus has, further comprising: a first information input means for inputting information concerning the first apparatus and the second apparatus which constitute the network; a second information input means for inputting the connection by the fiber channel between the port which the first apparatus has and the port which the second apparatus has; an image making means for making a network configuration image from the network configuration information which is the configuration information of a network in which the first apparatus and the second apparatus are connected by the fiber channel based on the information inputted from the first and second information input means; and a display means for displaying the image made by the image making means.

According to another embodiment of the present invention, A computer data signal embodied in a carrier wave for constructing a network which comprises a first apparatus having at least one port, a second apparatus having at least one port, and a fiber channel connecting the port which the first apparatus has and the port which the second apparatus has, used to direct a computer to perform: a first information input process of inputting information concerning the first apparatus and the second apparatus which constitute the network; a second information input process of inputting the connection by the fiber channel between the port which the first apparatus has and the port which the second apparatus has; an image making process of making a network configuration image from the network configuration information which is the configuration information of the network in which the first apparatus and the second apparatus are connected by the fiber channel based on the information inputted from the first and second information input processes; and a display process of displaying the image made by the image making process.

According to another embodiment of the present invention, A network construction aid apparatus in which at least one server having at least one port, at least one storage having at least one port, and at least one switch having a plurality of fiber channel ports are connected by a plurality of fiber channels, comprising: a first information input means for inputting information concerning each device of the server, the storage and the switch; a second information input means for inputting information concerning the connection by a plurality of fiber channels between the server, the storage and the fiber channel switch; an image making means for making a network configuration image from the network configuration information indicating that the server, the storage and the fiber channel switch are connected by a plurality of fiber channels based on the information inputted from the first and second information input means; and a display means for displaying the network configuration imaged made by the image making means.

According to another embodiment of the present invention, A network construction aid apparatus in which at least one server having at least one port, at least one storage having at least one port, and at least one switch having a plurality of ports are connected by a plurality of fiber channels, further comprising: a provisional port information storage means for storing the provisional port information corresponding to the information of any two ports out of the information concerning each port of the server, the storage and the switch; and a port information replacement means for replacing the stored provisional port information by the inherent port information corresponding to the provisional port information after obtaining inherent information of any two ports out of the inherent information concerning each port of the server, the storage and the switch.

According to another embodiment of the present invention, A network construction aid apparatus in which at least one server having at least one port, at least one storage having at least one port, and at least one switch having a plurality of ports are connected by a plurality of fiber channels, further comprising: a storage means for storing the association information which associates the provisional port information of the switch with at least one out of the provisional port information of the server, the provisional port information of the storage and the provisional port information of the switch itself; an obtaining means for obtaining inherent port information which at least any two of the server, the storage and the switch have out of the inherent port information which these devices have; an updating means for updating the provisional information of the association information stored by the storage device to the inherent port information obtained by the obtaining means for which corresponds to the provisional port information; and a reflection means for reflecting the association information updated by the updating means to at least one out of the server, the storage and the switch.

According to another embodiment of the present invention, A network construction aid apparatus in which at least one server having at least one port, at least one storage having at least one port, and at least one switch having a plurality of ports are connected by a plurality of fiber channels, further comprising: an access path making means for making the access path information which is the information of the access path between the server, the switch and the storage; and an access path setting means for setting the access path between the server, switch and the storage based on the access path information made by the access path making means.

According to another embodiment of the present invention, A network construction aid apparatus which comprises a first apparatus having at least one port, a second apparatus having at least one port, and a fiber channel connecting the port which the first apparatus has and the port which the second apparatus has, further comprising: a first information input means for inputting information concerning the first apparatus and the second apparatus which constitute the network; a second information input means for inputting the connection by the fiber channel between the port which the first apparatus has and the port which the second apparatus has; an image making means for making a network configuration image from the network configuration information which is the configuration information of a network in which the first apparatus and the second apparatus are connected by the fiber channel based on the information inputted from the first and second information input means; and a display means for displaying the image made by the image making means.

BRIEF DESCRIPTION OF THE DRAWINGS

The present invention will be more apparent from the following detailed description when the accompanying drawings are referenced.

FIG. 1 shows a construction example of a SAN system.

FIG. 3 is a block diagram showing the internal configuration of a computer.

FIG. 4 shows the concept of system design aid processing.

FIG. 12 is a block diagram showing the aid processing function of the system construction of the SAN system construction aid apparatus.

FIG. 15 shows an example of the display of the confirmation result of the physical configuration of an actual SAN system.

FIG. 16 shows the design outline of the system using a SAN system construction aid apparatus in working example 1.

FIG. 17 shows the state of WWN of each port in working example 1.

FIG. 19 shows the state of WWN of each port in working example 2.

DESCRIPTION OF THE PREFERRED EMBODIMENTS

Figure 2:
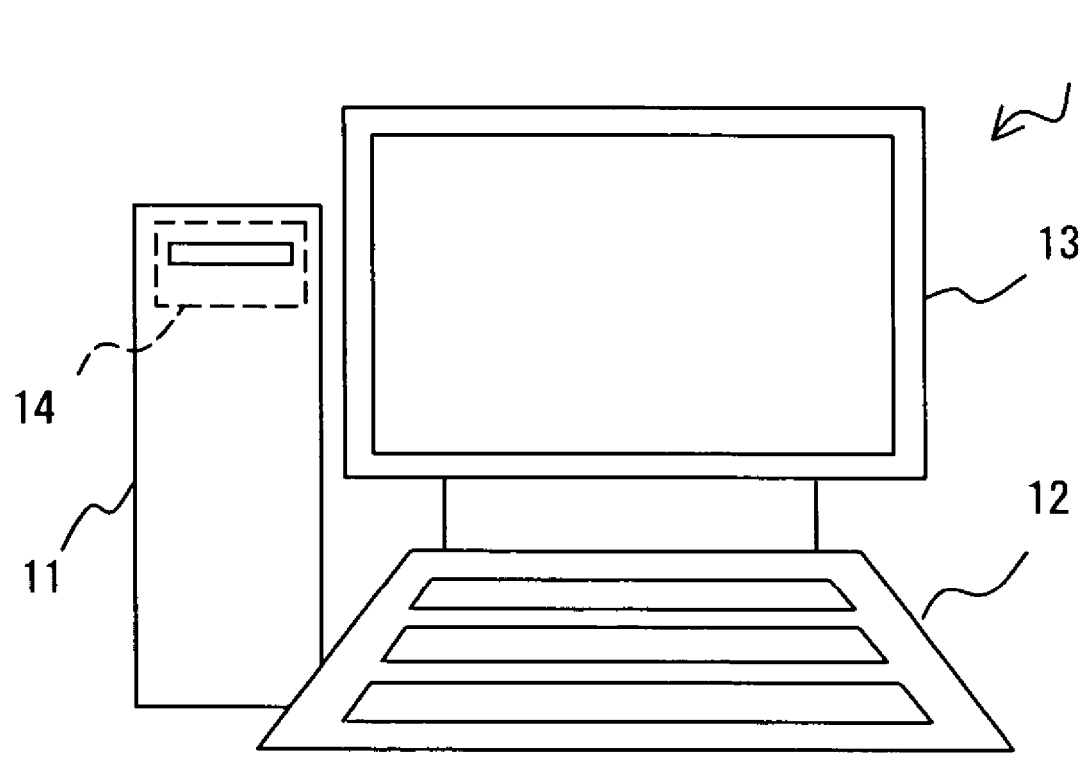
FIG. 2 shows a general view of a general-purpose computer in which a SAN system construction aid program related to the present invention is installed.

According to an embodiment of the present invention, a SAN system construction aid apparatus is provided in which at least one server having at least one fiber channel, at least one storage having at least one fiber channel port, and at least one fiber channel switch having a plurality of fiber channel ports are connected by a plurality of fiber channels, and which comprises a first information input device for inputting information concerning the server, the storage and the fiber channel switch device, a second information input device for inputting information concerning the physical connection by a plurality of fiber channels between the server, the storage and the fiber channel switch, an image making device for making a configuration image of a virtual SAN system which is physically connected by a plurality of fiber channels between the server, the storage and the fiber channel switch based on the information inputted from the first and second information input devices, and a display device for displaying the imaged made by the image making device The SAN system construction aid apparatus comprises a third information input device for inputting information concerning the logical connection between the server, the storage and the fiber channel switch of the virtual SAN system, a display control device for adding an image indicating the logical connection to the configuration image of the virtual SAN system displayed in the display device based on the information inputted from the third information input device, and a recording device for recording, in a recording medium, information concerning the configuration of the virtual SAN system displayed in the display device and information concerning the logical connection of the virtual SAN system inputted from the third information input device.

According to another embodiment of the present invention, the SAN system construction aid apparatus comprises an information obtaining device for obtaining information concerning the fiber channel port of the server, the storage and the fiber channel switch by means of communications with these devices of the SAN system which has been actually constructed based on the block diagram of the virtual SAN system which is made in advance, and a configuration confirmation device for confirming whether the physical connection relationship of the SAN system which has been actually constructed conforms to that of the virtual SAN system by comparing the information concerning the fiber channel port obtained by the information obtaining device with the information concerning the fiber channel port of the virtual SAN system.

According to another embodiment of the present invention, a SAN system construction aid method is provided which uses a computer for constructing a SAN system in which at least one server having at least one fiber channel, at least one storage having at least one fiber channel port, and at least one fiber channel switch having a plurality of fiber channel ports are connected by a plurality of fiber channels, and which comprises a first information input process of inputting information concerning the physical connection between the server, the storage and the fiber channel switch which constitute the SAN system to the computer, a second information input process of inputting information concerning the physical connection by a plurality of fiber channels between the server, the storage and the fiber channel switch, an image making process of making a configuration image of a virtual SAN system which is physically connected by a plurality of fiber channels between the server, the storage and the fiber channel switch based on the information inputted from the first and second information input devices, and a display process of displaying the imaged made by the image making process.

According to another embodiment of the present invention, a SAN system construction aid program is provided in which at least one server having at least one fiber channel, at least one storage having at least one fiber channel port, and at least one fiber channel switch having a plurality of fiber channel ports are connected by a plurality of fiber channels, and which directs a computer to function as a first information input device for inputting information concerning the physical connection between the devices of the server, the storage and the fiber channel switch, a second information input device for inputting information concerning the physical connection by a plurality of fiber channels between the server, the storage and the fiber channel switch, an image making device for making a configuration image of a virtual SAN system which is physically connected by a plurality of fiber channels between the server, the storage and the fiber channel switch based on the information inputted from the first and second information input devices, and a display device for displaying the imaged made by the image making device.

According to another embodiment of the present invention, the SAN system construction aid program is provided which directs the computer to function as a provisional port information storage device for storing provisional information as port information of each fiber channel of the server, each fiber channel of the storage and each fiber channel of the fiber channel switch, and a port information replacement device for replacing the stored provisional port information by the inherent port information corresponding to the provisional port information after obtaining the inherent port information of each fiber channel of the server, each fiber channel of the storage and each fiber channel of the fiber channel switch.

According to another embodiment of the present invention, the SAN system construction aid program is provided which directs the computer to perform the process of constructing a SAN system in which at least one server having at least one fiber channel, at least one storage having at least one fiber channel port, and at least one fiber channel switch having a plurality of fiber channel ports are connected by a plurality of fiber channels, and which directs the computer to perform the provisional port information storage process of storing provisional port information before obtaining inherent port information of each fiber channel of the server, each fiber channel of the storage and each fiber channel of the fiber channel switch, and the port information replacement process of replacing the stored provisional port information by the inherent port information after obtaining inherent port information of each fiber channel of the server, each fiber channel of the storage and each fiber channel of the fiber channel switch.

According to another embodiment of the present invention, the SAN system construction aid program is provided which directs the computer to perform the process of constructing a SAN system in which at least one server having at least one fiber channel, at least one storage having at least one fiber channel port, and at least one fiber channel switch having a plurality of fiber channel ports are connected by a plurality of fiber channels, and which directs the computer to perform the access path making process of making access path information which is the access path information between the server, the fiber channel switch and the storage, and an access path setting process of setting an access path between the server, the fiber channel switch and the storage based on the access path information made in the access path making process.

According to another embodiment of the present invention, the SAN system construction aid apparatus is provided which comprises a provisional port information storage device for storing provisional information as port information of each fiber channel of the server, each fiber channel of the storage and each fiber channel of the fiber channel switch, and a port information replacement device for replacing the stored provisional port information by the inherent port information corresponding to the provisional port information after obtaining the inherent port information of each fiber channel of the server, each fiber channel of the storage and each fiber channel of the fiber channel switch.

According to another embodiment of the present invention, the SAN system construction aid apparatus is provided in which at least one server having at least one fiber channel, at least one storage having at least one fiber channel port, and at least one fiber channel switch having a plurality of fiber channel ports are connected by a plurality of fiber channels, and which comprises a provisional port information storage process of storing provisional port information before obtaining inherent port information of each fiber channel of the server, each fiber channel of the storage and each fiber channel of the fiber channel switch, and a port information replacement process of replacing the stored provisional port information by the inherent port information after obtaining inherent port information of each fiber channel of the server, each fiber channel of the storage and each fiber channel of the fiber channel switch.

Thus, when information concerning the devices of server, storage and fiber channel switch which are the constituents of the SAN system under consideration (for example, information about the type and manufacturer of these devices) is inputted, and information concerning the physical connection between the server, the storage and the fiber channel switch (more specifically, information indicating the connection relationship between the FC ports using an inherent world wide port name (hereinafter referred to as "WWPN") set to each FC port) is inputted, a configuration image of a virtual SAN system which is physically connected by a fiber channel between the FC port of the server and the FC port of the fiber channel switch, and between the FC port of the storage and the FC port of the fiber channel switch is displayed on the display of the computer.

A user can visually confirm the physical configuration of the SAN system under consideration by means of the displayed image, and can easily change or correct the constituents of the SAN system and the wiring relationship between the constituents of the SAN system.

When information concerning the logical connection of the SAN network system (more specifically, information indicating the connection relationship between the FC ports using an inherent WWPN set to each FC port) is inputted, an image indicating a logical access path between the server and the storage is displayed in addition to the configuration image of the virtual SAN system displayed on the display of the computer. Thus, the user can visually grasp the access relationship between each server and each storage (a substantial connection relationship in the SAN system), and can simply and easily construct the SAN system by correcting the information concerning the access path.

It is possible to definitely judge the correct or the incorrect of the physical configuration of the actual SAN system by connecting the SAN system and the SAN construction aid apparatus, for example, by a LAN after the SAN system is actually built based on the configuration image of the virtual SAN system, reading information concerning each FC port of the server, the storage and the fiber channel switch of the actual SAN system (more specifically, WWPN set to each FC port) to the SAN system construction aid apparatus, and comparing that information with the information concerning each FC port between the server, the storage and the fiber channel switch of the virtual SAN system stored in the SAN system construction aid apparatus. The result of the judgement is displayed on the display of the computer, so it is possible to confirm the correct or the incorrect of the wiring of the fiber channel more rapidly than a user did through visual inspection in the past and to definitely reduce a failure in the confirmation.

After it is confirmed that the physical configuration of the actual SAN system is as designed, an access path is set to the actual SAN system from the SAN system construction aid apparatus via the LAN based on the information concerning the access path set to the virtual SAN system. An access path is set, for example, by setting the zoning indicating the access control between the server and the storage from the SAN system construction aid apparatus to each fiber channel switch in the actual SAN system. Thus, it is possible to implement a substantial connection between the server and the storage in the actual SAN system, and to definitely reduce labor and errors in work.

It is also possible to easily constitute the SAN system construction aid apparatus by installing a SAN system construction aid program in a computer.

It is also possible to realize the reduction of the time required for system design and the simplification of the setting of information necessary for system construction to an actual apparatus in the site of installation.

The features and advantages of the present invention will be more apparent from the embodiments of the present invention described hereinafter.

Described below are preferred embodiments of the present invention with reference to the accompanying drawings.

The SAN system construction aid apparatus embodying the present invention is realized by installing the SAN system construction aid program comprising (i) the processing program which aids system design when a SAN system is introduced, and (ii) the processing program which aids system construction when a SAN system is actually constructed, in a general-purpose computer, as shown in FIG. 2.

The former processing program (i) is used to introduce a SAN system, so an arbitrary general-purpose computer can be used. The latter processing program (ii) is used when a SAN system is actually constructed, so when the constituent devices such as the server of the SAN system which has been actually constructed are connected to any other computer (for example, the server which manages the SAN system) via a LAN, that computer is used.

Described in this embodiment is the SAN system construction aid apparatus using an arbitrary general-purpose computer, with regard to the former processing program (i), and is the SAN system construction aid apparatus using a SAN management server of the SAN system connected to the SAN system which has been actually constructed via a LAN, with regard to the latter processing program (ii). The SAN system construction aid apparatus in which the SAN system construction aid program embodying the present invention is installed can be connected to the SAN system which has been actually constructed via a LAN, and can be used as the management server of the SAN system.

First, described below is the SAN system construction aid apparatus which aids system design when a SAN system is introduced.

A general-purpose computer 1 shown in FIG. 2 comprises a main frame 11, a keyboard 12 which is an input device connected externally to the main frame 11, and a display 13 which is an output device. The main frame 11 includes a driving device (drive) 14 of removable media such as a floppy disk and a CD-ROM.

Included in the main frame 11 are a CPU (central processing unit) 111, a ROM 112, a RAM 113, an input and output interface 114, a media interface 115, as shown in FIG. 3). The ROM 112, RAM 113, input and output interface 114 and media interface 115 are connected to the CPU 111 via a bus line 116. The keyboard 12 and the display 13 are connected to the input and output interface 114, and the drive 14 of the removable media is connected to the media interface 115.

Not only basic software such as operating system (OS) but also a SAN system construction aid program embodying the present invention are stored in the ROM 112 in advance. The CPU 11 comprises a computing unit performing arithmetic processing and a control unit controlling the operation of the computing unit, the storages such as ROM 112 and RAM 113, the input and output device such as keyboard 12 and display 13, and the drive 14. The CPU 111 implements the aid processing of SAN system design which will be described later by reading the SAN system construction aid program stored in the ROM 112 to the RAM 113 and executing this program.

System design aid processing is the processing in which information necessary for the construction of a SAN system is inputted to a SAN system construction aid apparatus 1, a design drawing G of a virtual SAN system is made using the information, and the design drawing is displayed on the display 13.

Information necessary for the construction of a SAN system is information concerning the server, the storage and the fiber channel switch (hereinafter referred to as "FC switch") which are the basic devices constituting a SAN system (hereinafter referred to as "device information"), information concerning the physical access path by a fiber channel between these devices (hereinafter referred to as "physical path"), and information concerning the logical access path in which the server can access the storage via the FC switch. In this embodiment, to construct a SAN system using a fiber channel, each device of the server, the storage and the FC switch must be equipped with the FC port to which the fiber channel is connected.

Specifically speaking, device information is information such as the kind of each device (manufacturer, product name, etc.) and quantity, and logical access path information is the information indicating that the other-side FC port which is connected by the fiber channel is set to each FC port of the server, the storage and the FC switch.

Inherent ID information named world wide port name (WWPN) consisting of a number which identifies a manufacturer and a number which the manufacturer independently sets to the FC port is set to each FC port which the server, the storage and the FC switch have. Consequently, the logical access path information of a SAN system can be set by setting the WWPN of the other-side FC port which is connected by a fiber channel to each FC port of the server, the storage and the FC switch in the design drawing of the SAN system.

In the SAN system construction aid apparatus 1, since the design drawing of the SAN system is made by a virtual SAN system, as will be described later, the WWPN of each FC port of the server, the storage and the FC switch in the virtual SAN system is unfixed, so the SAN system construction aid apparatus 1 automatically makes a provisional WWPN. Consequently, the provisional WWPN of each FC port which is set in advance by the SAN system construction aid apparatus 1 is also included in the device information, and the provisional WWPN included in the device information is used in setting the logical access path in the virtual SAN system.

Information concerning an access path is, specifically speaking, the information on the zoning of FC switch. The zoning of FC switch means that each FC port of the server divides the FC port of the accessible storage into zones, and that when a plurality of servers exist, the storage zone of the accessible storage of each server is dynamically controlled thereby. Even if a plurality of storages exist, since an accessible storage zone is allocated to each server, a plurality of storages are managed practically as one storage, thus causing the efficiency of the storage to be improved.

The zoning of FC switch is set using the provisional WWPN of each FC port, and specifically speaking, the FC port on the side of the accessible server and the FC port on the side of the storage are divided into a plurality of zones between the server and the storage, and the FC port on the side of the server and the FC port on the side of the storage which belong to each zone are identified by the provisional WWPN.

Device information is stored in removable media M after, for example, a file of device information is made for each device in advance, and the file is read from the removable media M by the drive 14 and is inputted to the SAN system construction aid apparatus 1 (refer to FIG. 4).

The device information which is inputted to the SAN system construction aid apparatus 1 is stored in the RAM 113. The CPU 111 reads out a character image of the server, storage and FC switch stored in the ROM 112 based on the information concerning the devices of server, storage and FC switch of the SAN system stored in the RAM 113, makes an image in which each device is properly arranged using the character image, and displays the image on the display 13.

The part of each FC port in the image displayed on the display 13 in which the server, the storage and the FC switch are arranged constitutes a GUI, and the designer of the SAN system construction aid apparatus 1 can set a physical path by designating the FC port which is physically connected by a fiber channel. When information of the physical path is inputted, the CPU 111 adds an image connected by the fiber channel to the image displayed on the display 13 in which the server, the storage and the FC switch are arranged based on the information. When the CPU 111 finishes the setting of the physical path by repeating this procedure, the CPU 111 makes a file of the information concerning the physical configuration of the SAN system displayed on the display 13 (including the system configuration drawing and the information of the physical path) (hereinafter, this file is referred to as "SAN system configuration file"), and stores the file in the RAM 113.

When a physical configuration image of a physical SAN system is completed, it is possible to set an access path using the configuration image. This access path is set by designating the FC port of the accessible server and the FC port of the storage in the same way as the setting of the physical path. When the information of the access path is inputted, the CPU 111 adds an image of the access path to the configuration image of the SAN system displayed on the display 13. When the CPU 111 finishes the setting of the access path by repeating this procedure, the CPU 111 makes a command for setting an access path to the SAN system which has been actually constructed from the access path setting information, and stores the file of the command (hereinafter, this file is referred to as "access connection command file") in the RAM 113.

When the SAN system construction aid apparatus 1 is used as the management server of the SAN system which is actually constructed, the SAN system configuration file and the access connection command file which are stored in the RAM 113 are used for the aid processing which the SAN system construction aid apparatus 1 implements when the SAN system is actually constructed. When a computer different from the SAN system construction aid apparatus 1 is used as the SAN management server, the SAN system configuration file and the access connection command file which are stored in the RAM 113 of the SAN system construction aid apparatus 1 are loaded to the SAN management server via the removable media M such as a CD-ROM and are used for the aid processing of the actual construction of the SAN system which the management server implements.

Figure 5:
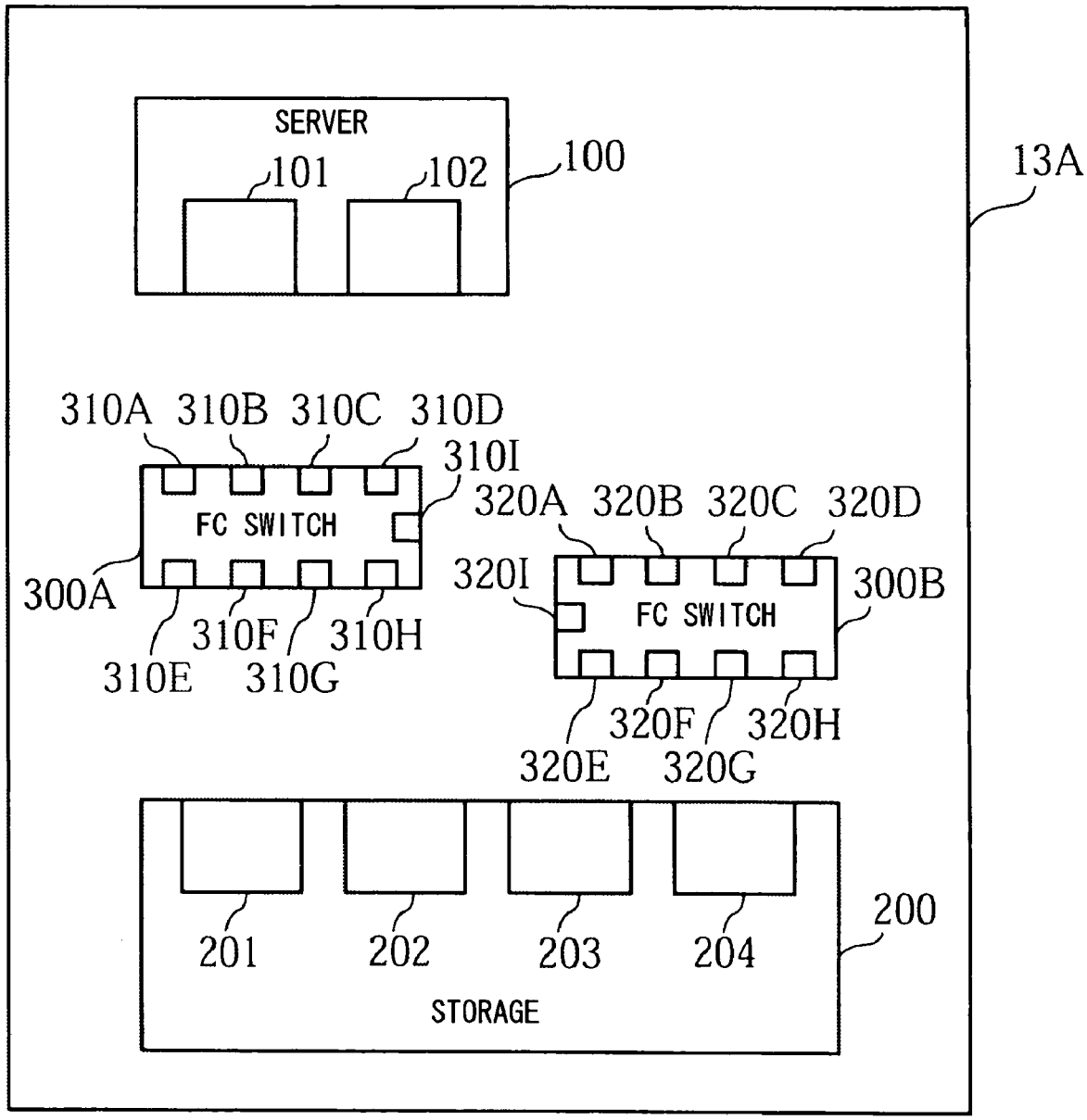
FIG. 5 shows the arrangement image of a server, a storage and FC switches displayed on the display.

Described below is the system design aid processing, taking the case in which a SAN system shown in FIG. 1 is constructed as an example. In system design aid processing (i), when information concerning one server 100, one storage 200 and two FC switches 300A and 300B is inputted to the SAN system construction aid apparatus 1, the device information is stored in the RAM 113. An image in which one server 100, one storage 200 and two FC switches 300A and 300B are properly arranged is made, as shown in FIG. 5, and the arrangement image is displayed on the screen 13A of the display 13.

Figure 6:
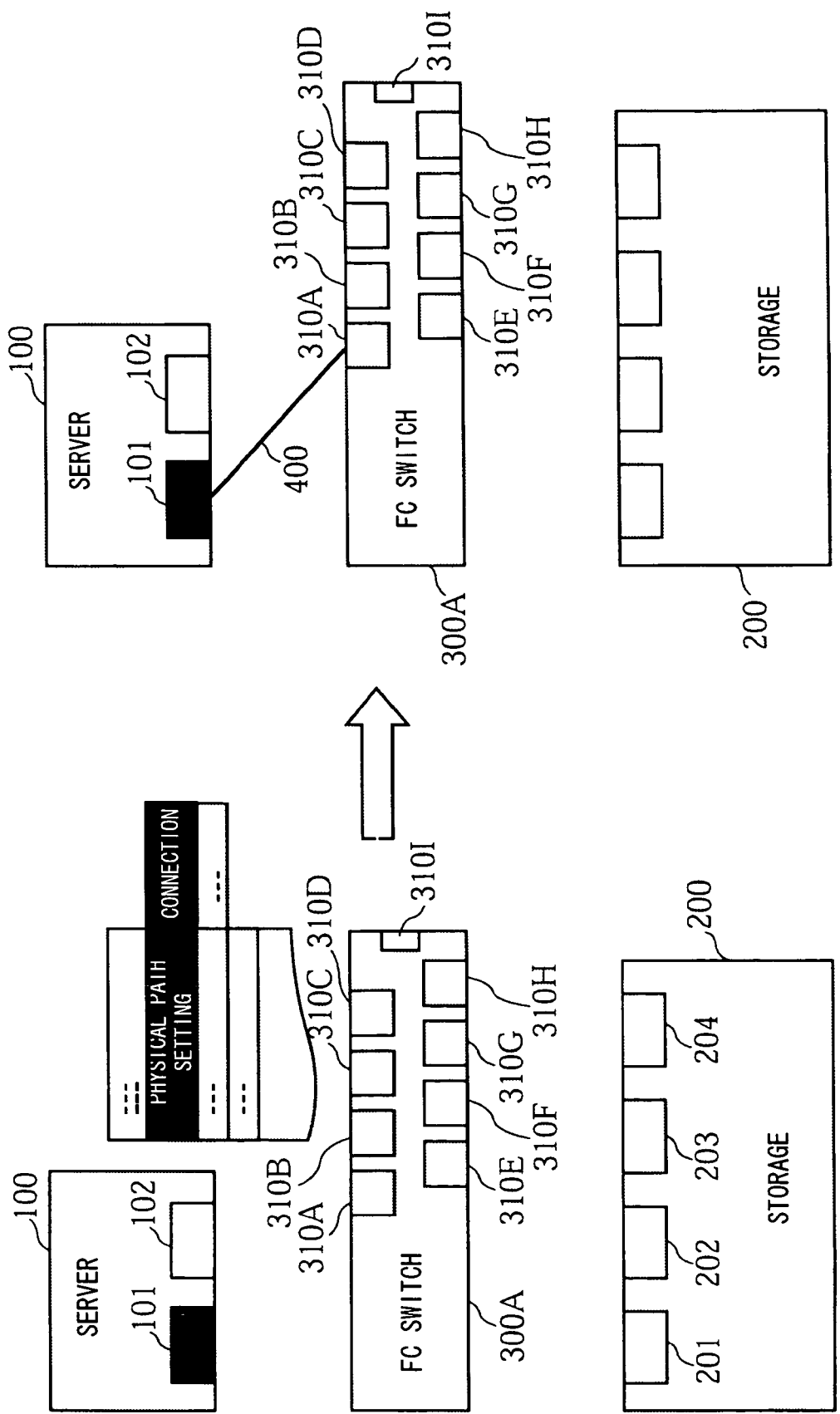
FIG. 6 shows the setting of a physical path using the arrangement image of a server, a storage and FC switches.

When the arrangement image of the server, the storage and the FC switch is displayed on the display 13, a physical path can be set, and when the designer designates, for example, the FC port 101 of the server 100 and the FC port 310A of the FC switch 300A which he wants to connect by a fiber channel 400 (in FIG. 6, the color of the designated FC port has changed), as shown in FIG. 6, the wiring drawing of the fiber channel 400 is added between the FC port 101 and the FC port 310A in the arrangement image.

If WWPNs1 and WWPNa are set as a provisional WWPN to the FC port 101 of the server 100 and the FC port of the FC switch 300A, the WWPNa of the other-side FC port 310A is set to the FC port 101 as physical path setting information, and the provisional WWPNs1 of the other-side FC port 101 is set to the FC port 310A as physical path setting information.

Figure 7:
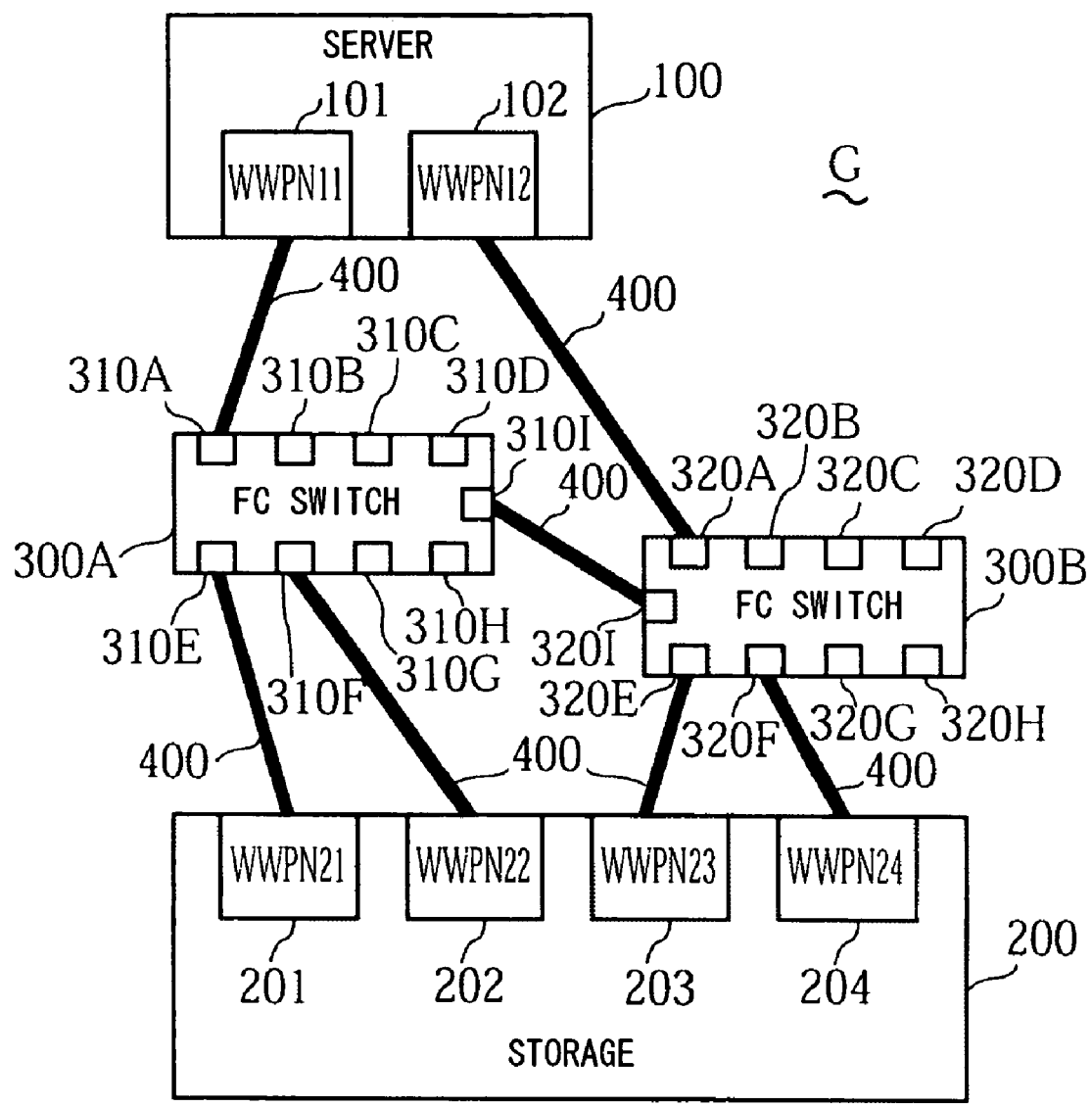
FIG. 7 shows an example of the physical block diagram of a virtual SAN system.

A physical path is also set in the same way for the other FC ports, and when this setting is completed, a configuration image G of a virtual SAN system in which the server 100, the storage 200 and the FC switches 300A and 300B are physically connected by a fiber channel is displayed on the display 13, as shown in FIG. 4 and FIG. 7, and an access path can be set. Also, a SAN system configuration file is made for this configuration image, and is stored in the RAM 113.

Figure 8:
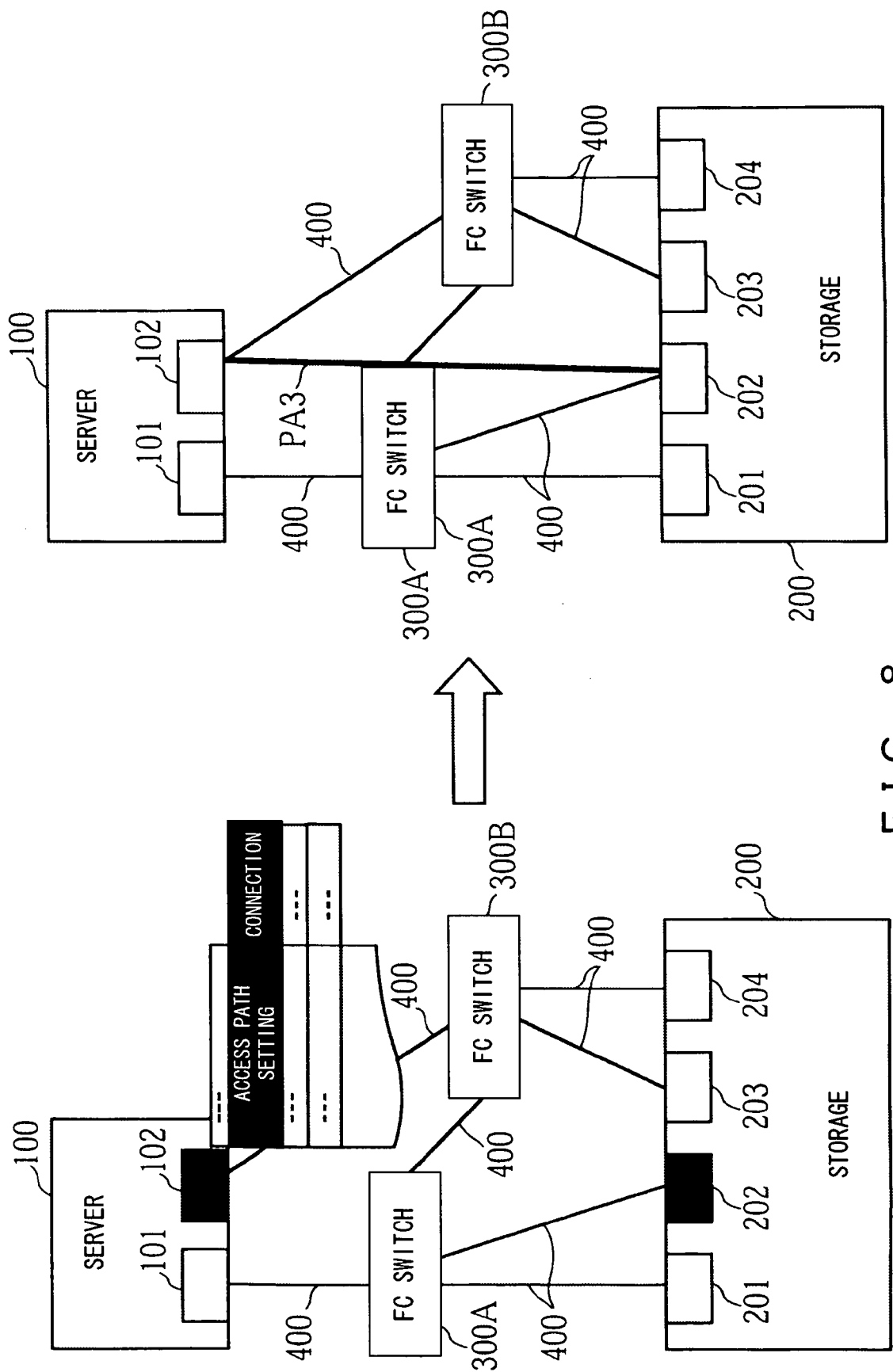
FIG. 8 shows the setting of an access path using the physical block diagram of a virtual SAN system.

When the designer designates the FC port 102 of the server 100 and the FC port 202 of the storage 200 which he wants to connect by a fiber channel in the state of the display shown in FIG. 7, as shown in FIG. 8 (in FIG. 8, the color of the designated FC ports has changed), the drawing of an access path AP3 is added to the SAN system configuration image between the FC port 102 and the FC port 202.

An access path is set in the same way for the other FC ports, and when this setting is completed, a configuration image of a virtual SAN system (refer to FIG. 1) to which access paths AP1 to AP4 are added is displayed on the display 13. Then, an access connection command file is made from the information of the set access path, and is stored in the RAM 113, and then, the system design aid processing completes.

Figure 9:
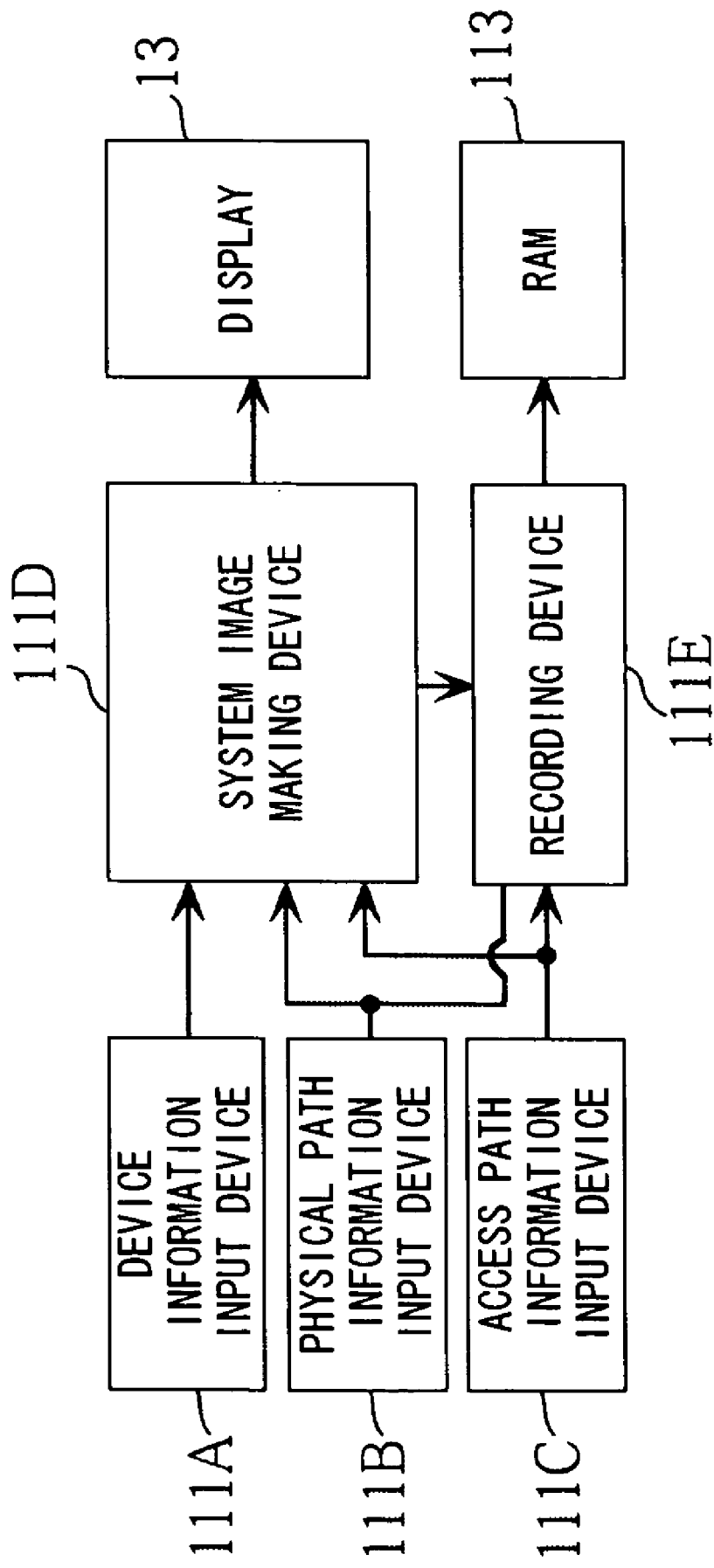
FIG. 9 is a block diagram showing the system design aid processing function of the SAN system construction aid apparatus.

FIG. 9 is a block diagram showing the system design aid processing function of the SAN system construction aid apparatus 1.

A device information input device 111A shown in FIG. 9 inputs information concerning the server, the storage and the FC switch and corresponds to the removable media M and the drive 14 of the embodiment, and corresponds to a first information input device embodying the present invention. A physical path information input device 111B and a access path information input device 111C input information concerning the physical path and information concerning the access path respectively, and correspond to the input device such as the keyboard of the embodiment, and correspond to a second information input device and a third information input device embodying the present invention respectively. A system image making device 111D makes a configuration image of a virtual SAN system displayed on the display 13, and corresponds to the image making device and the display control device embodying the present invention. The display 13 corresponds to the display device embodying the present invention. A recording device 111E makes a SAN system configuration file and an access path connection command file, and records them in the RAM 113, and corresponds to the recording device embodying the present invention.

Figure 10:
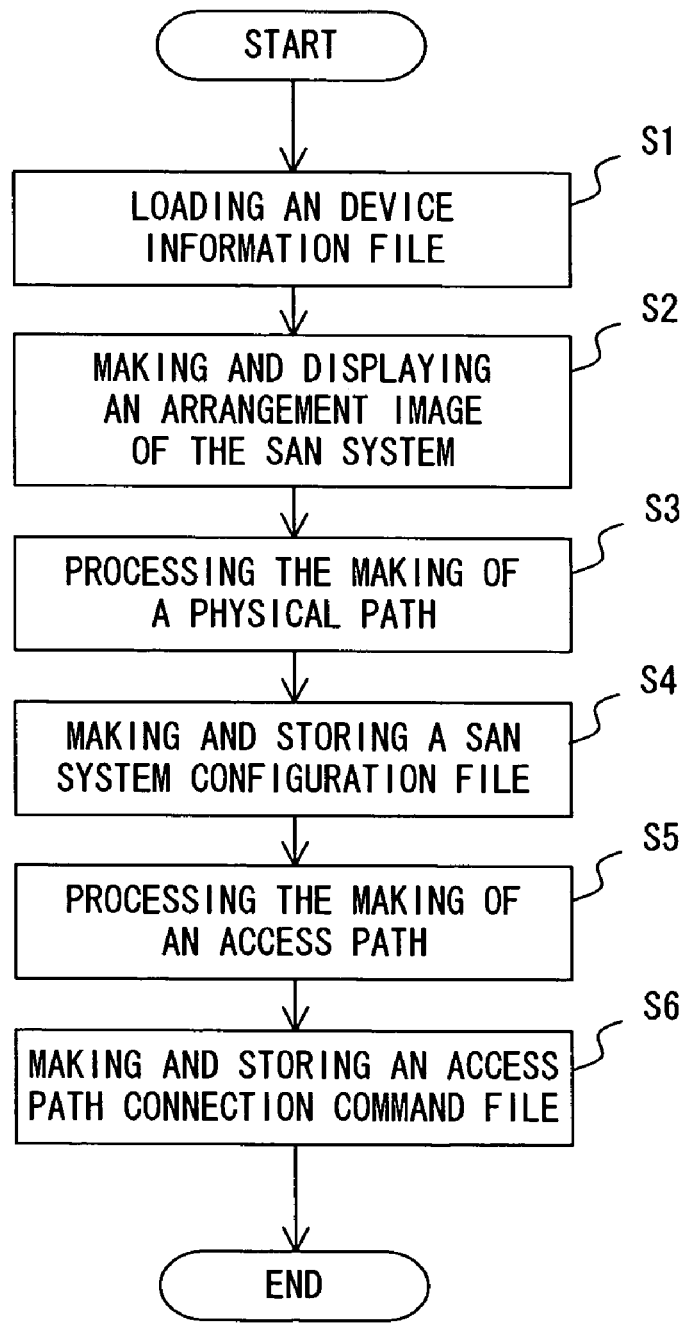
FIG. 10 is a flowchart showing the processing procedure for SAN system construction aid processing.

Described below is the processing procedure of the system design aid processing of the SAN system construction aid apparatus 1 with reference to the flowchart shown in FIG. 10.

First, The CPU 111 reads the file of each device from the removable media M such as CD-ROM and MO recording the file of information concerning the server 100, the storage 200 and the fiber channel switch 300 which constitute the SAN system by means of the driving device 14, and stores the file in the RAM 113 (S1. Input of device information).

Then, the CPU 111 reads the character images of the server, the storage and the FC switch from the ROM 112 and the device information stored in the RAM 113 based on the configuration number of the server 100, the storage 200 and the FC switch 300, and arranges these character images in a prescribed format properly and displays them on the screen 13A of the display 13 (S2. Refer to FIG. 5).

Then, the CPU 111 implements the making processing of the physical path based on the information concerning the physical path inputted from the input device such as the keyboard 12 (S3. Refer to FIG. 6 and FIG. 7). In other words, the CPU 111 adds a connection drawing of the fiber channel to the arrangement image of the virtual SAN system displayed on the display 13.

Then, the making processing of the physical path completes, and the CPU 111 makes a SAN system configuration file from the configuration image of the physically connected virtual SAN system displayed on the display 13 and the physical path information, and stores the file in the RAM 113 (S4).

Next, the CPU 111 implements the making processing of the access path based on the information concerning the access path inputted from the input device such as the keyboard 12 (S5. Refer to FIG. 8). That is, the CPU 111 adds a drawing of an access path to the configuration image of the virtual SAN system displayed on the display 13.

Finally, when the making processing of the access path completes, the CPU 111 makes an access connection command file from the inputted access path information, stores the file in the RAM 113 (S6) and terminates the system design aid processing.

Thus, in the system design aid processing, since a configuration image of the SAN system under consideration is displayed on the display 13, and the physical path and the access path can be set using the displayed image, a system designer can design the SAN system easily and efficiently. When any change is made in the system design, he can easily correct the system design.

Next, described below is the SAN system construction aid apparatus which aids the system construction when a SAN system is actually constructed.

The system construction aid processing (ii) confirms the physical path of the actual SAN system and automatically sets the access path after the SAN system is actually constructed based on the design drawing of the virtual SAN system which is made by the SAN system construction aid apparatus 1.

Consequently, the system construction aid processing (ii) is implemented in the state in which the SAN system construction aid apparatus 1 is connected to the server, the storage and the FC switch of the SAN system which has been actually constructed via a LAN.

Figure 11:
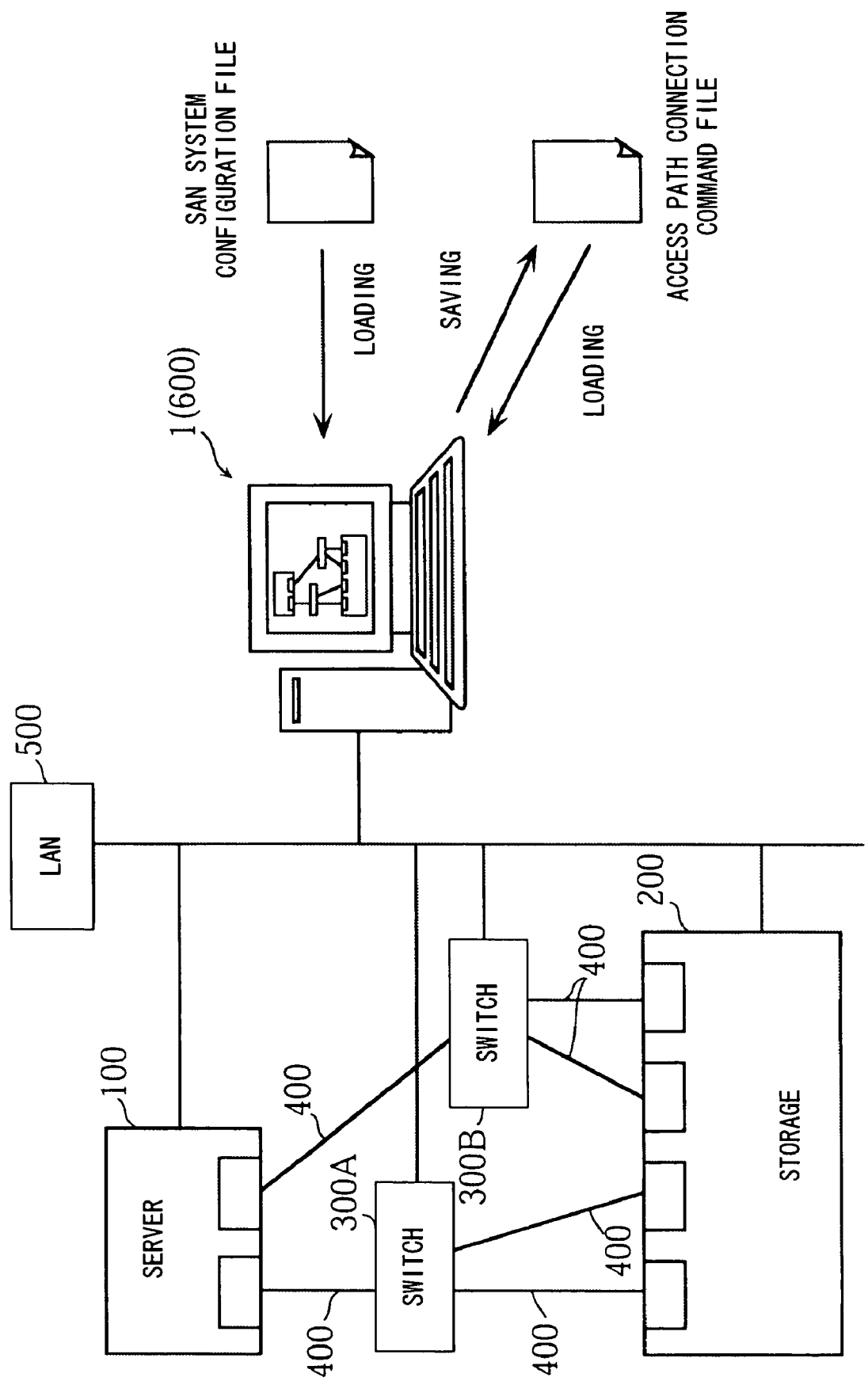
FIG. 11 shows the configuration in which a SAN management server is used as a SAN system construction aid apparatus in the actual SAN system to which the SAN management server is connected via a LAN.

FIG. 11 shows the configuration in which a SAN management server is used as a SAN system construction aid apparatus when the SAN system which has been actually constructed is connected to the SAN management server of the SAN system via a LAN.

The example of the physical configuration of the SAN system which has been actually constructed, shown in FIG. 11, is the same as the example of the configuration of the SAN system shown in FIG. 1, and the SAN management server 600 is connected to the server 100, the storage 200 and the FC switch 300 of the SAN system via the LAN 500. The SAN management server 600 checks the setting state of the server 100, the storage 200 and the FC switches 300A and 300B constituting the SAN system via the LAN 500, and manages the SAN system with regard to the diagnosis of any abnormal phenomenon and the system recovery when any trouble occurs to the SAN system.

The SAN system configuration file and the access path connection command file are loaded to the SAN management server 600 via the removable media M, and the SA management server 600 implements the aid processing of the actual construction of the SAN system using these files.

FIG. 12 is a block diagram showing the internal configuration when the SAN management server 600 functions as a SAN system construction aid apparatus.

A LAN connection device 111F shown in FIG. 12 is connected to the server 100, the storage 200 and the FC switches 300A and 300B of the actual SAN system via the LAN 500 so that communications is performed between these devices. A switch information obtaining device 111G obtains the information indicating the connection relationship between the server, the storage and the FC switches of the actual SAN system (specifically, information of the WWPN of each FC port), so the switch information obtaining device 111G corresponds to the information obtaining device embodying the present invention. A system configuration confirmation device 111I confirms the correct or the incorrect of the physical configuration of the actual SAN system using the WWPN of each port obtained from the actual SAN system and the provisional WWPN set to each port of the virtual SAN system, and displays the result of the confirmation on the display 13, so the system configuration confirmation device 111H corresponds to system configuration confirmation device embodying the present invention. A logical connection setting device 111H automatically sets the access path to the actual SAN system using the information concerning the access path in the access path connection command file, so the logical connection setting device 111I corresponds to the logical connection setting device embodying the present invention.

Figure 13:
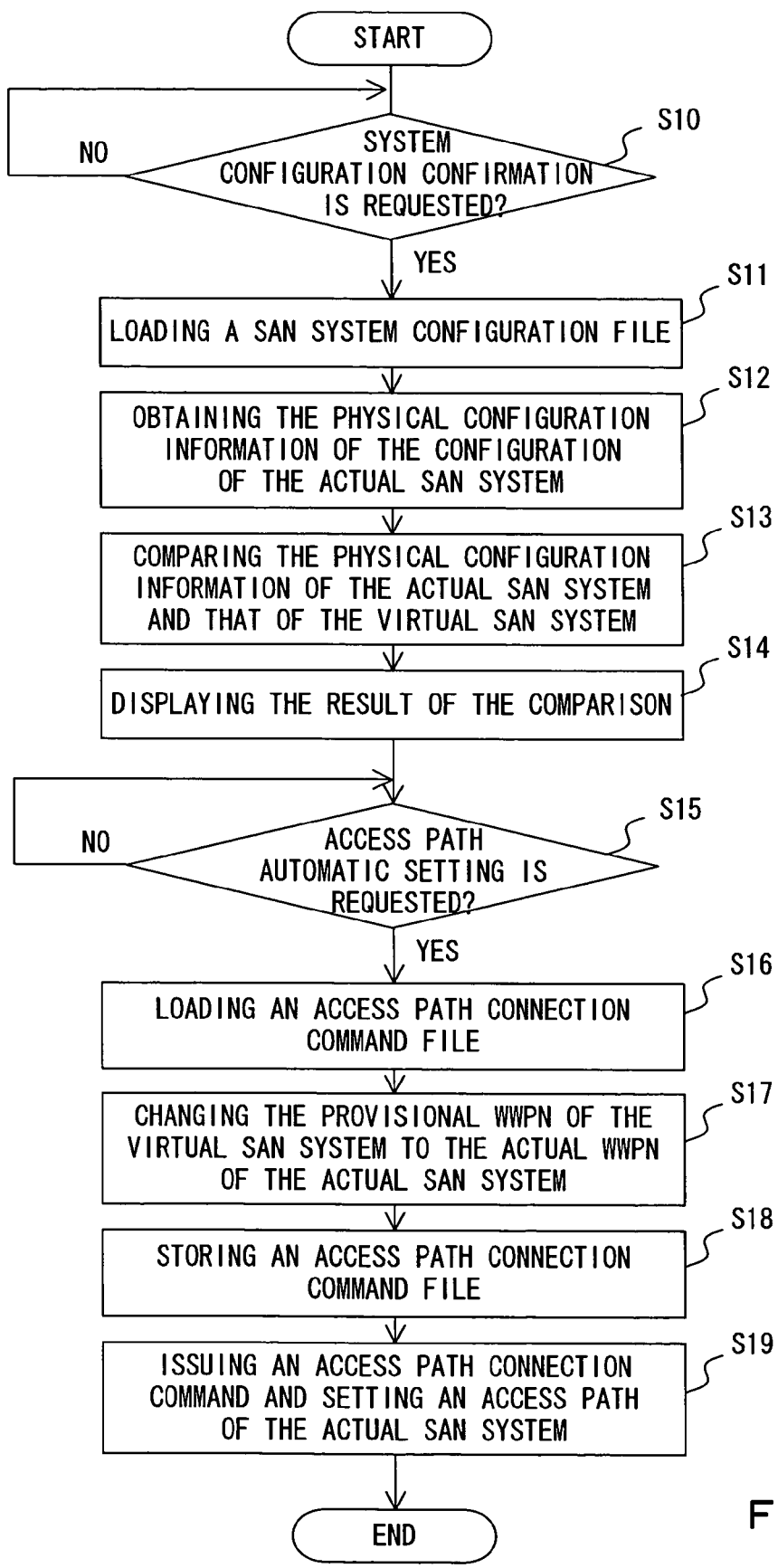
FIG. 13 is a flowchart showing the concrete processing procedure for system construction aid processing.

FIG. 13 is a flowchart showing the concrete processing procedure for system construction aid processing.

After the SAN system has been actually constructed based on the system design drawing by a virtual SAN system, as shown in FIG. 11, when a user inputs a "SAN system configuration confirmation request" from the input device 12 in the SAN management server 600 (YES in S10), the CPU 11 loads the SAN system configuration file stored in the RAM 113 to the work area of the RAM 113 (S11), obtains the physical configuration information (information of the physical path) from the actual SAN system via the LAN (S12), compares this information with the physical configuration information of the virtual SAN system (information of the physical path), and confirms whether the actual SAN system has been constructed as designed (S13).

Figure 14:
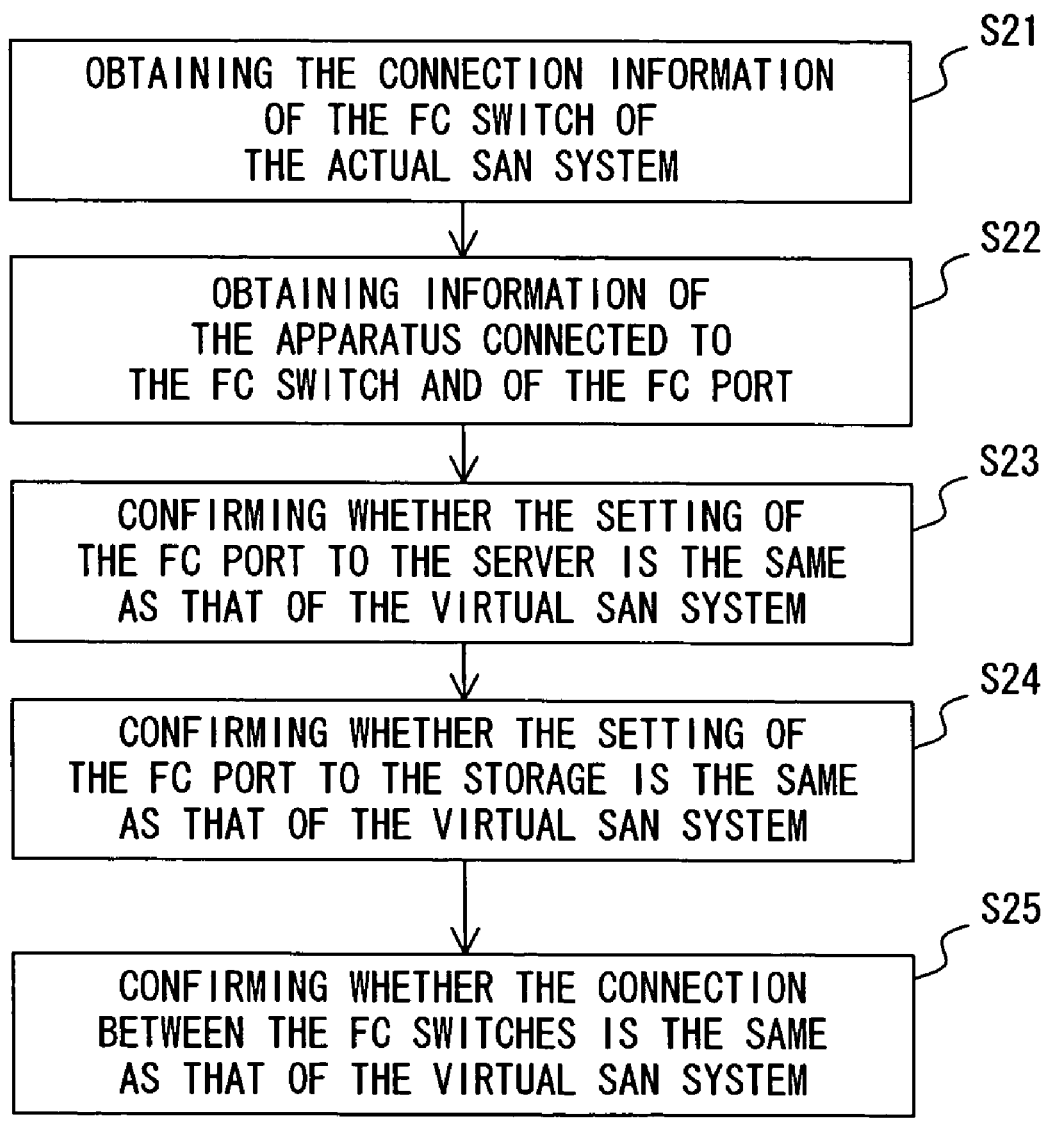
FIG. 14 is a flowchart showing the concrete processing procedure for confirming the physical configuration of an actual SAN system.

This confirmation processing is implemented in the procedure shown in FIG. 14. The CPU 111 obtains the connection information of each FC port from the FC switches 300A and 300B of the actual SAN system (S21). This connection information indicates the connection relationship between the server 100, the storage 200 and the FC switches 300A and 300B by means of WWPN. Since a number peculiar to a manufacturer is included in the WWPN, the CPU 111 recognizes the manufacturer and type of the server 100, the storage 200 and the FC switches 300A and 300B from this number, and confirms whether the devices constituting the actual SAN system are the same as those of the virtual SAN system (S22 to S25). At that time, the physical connection by the fiber channel 400 between the FC ports is also confirmed by confirming the WWPN of the FC port of the other-side FC switches of each FC port 310A to 310I and 300A and 300B.

The confirmation result of the physical configuration of the actual SAN system is displayed as the contents shown in FIG. 15 on the display 13 (S14). FIG. 15 shows an example of the display of the confirmation result of the physical configuration of the actual SAN system. In FIG. 15, the physical block diagram of the actual SAN system is indicated on the left-hand screen of the display 13, and the physical block diagram of the virtual SAN system is indicated on the right-hand screen of the display 13. In the example of the same figure, the FC switch 300A and the FC switch 300B are cascade-connected in the virtual SAN system, while the FC switch 300A and the FC switch 300B are not cascade-connected in the actual SAN system. In order to indicate the different parts between the two, the fiber channel 400 connected between the FC switches 300A and 300B of the virtual SAN system is made to blink.

The method of indicating the different parts is not limited to that of this case, but it is possible to employ, for example, the method of making the fiber channel 400 which is not connected between the FC switches 300A and 300B of the actual SAN system blink, or any other arbitrary method as occasion arises.

When there is no different part between the actual SAN system and the virtual SAN system, no blinking indication is displayed on the display 13, so the user can confirm that the physical configuration of the actual SAN system is properly constructed as designed from the display state. Consequently, when the blink is displayed on the display 13, the user can correct wrong devices and wiring of the actual SAN system based on the contents displayed.

When the user inputs an "access path automatic setting request" from the input device 12 in the state in which the physical configuration of the actual SAN system is the same as that of the virtual SAN system (YES in S15), the CPU 111 loads the access path connection command file stored in the RAM 113 to the work area of the RAM 113 (S16), and changes the access path set by the provisional WWPN in the access path connection command file to the access path set by formal WWPN obtained from the actual SAN system (S17), and after then, stores the access path connection command file in the RAM 113 again. (S18).

Then, the CPU 111 issues an access path connection command to the actual SAN system, and automatically sets the access path which is set to the virtual SAN system to the actual SAN system (S19). More specifically, the CPU 111 transmits zoning data (in the example shown in FIG. 1, the data of zone A (WWPN11, WWPN21), zone B (WWPN11 WWPN23), zone C (WWPN12, WWPN22), and zone D (WWPN12, WWPN24)) to the FC switches 300A and 300B, and sets the zone which regulates the access from the server 100 to the storage 200 to zoning mechanisms 313 and 312 of the FC switches 300A and 300B, thus setting the access path. Then, the same access path as that which has been set to the virtual SAN system is set to the actual SAN system, and the system construction aid processing terminates.

In the system construction aid processing, information of the WWPN of each FC port is obtained from each constituent device of the SAN system which has been actually constructed, and it is judged whether the actual SAN system has been constructed in accordance with the design drawing based on the WWPN information, and the judgement result is displayed on the display 13, so that it is possible to confirm, easily and promptly, the physical configuration when the actual SAN system is actually constructed based on the system design drawing. Since the difference between the actual SAN system and the system design drawing can be visually confirmed, it is possible to easily correct the actual SAN system and to prevent a failure in the confirmation.

After the physical construction of the SAN system is completed, an access path command is issued via the LAN 500 to automatically set the access path of the actual SAN system, so it is possible to set the access path easily and promptly and to prevent an error in the work definitely.

Described above is an example in which a general-purpose computer in which a SAN system construction aid program is installed via the removable media M is made a SAN system construction aid apparatus. In a computer which is connected to a network such as the Internet and a LAN, however, that computer may be made a SAN system construction aid apparatus by distributing the SAN system construction aid program via the network, or that computer maybe made a dedicated SAN system construction aid apparatus by having the ROM in which the SAN system construction aid program is stored in advance built-in.

Described below are a couple of working examples in this embodiment.

WORKING EXAMPLE 1

Described in this working example is the SAN system design to be implemented at an off-line time when the WWPN or WWNN of each port of each device (hereinafter referred to as "WWN") has not yet been obtained.

FIG. 16 shows the design outline of the system to be constructed using a SAN system construction aid apparatus in this working example. First, a SAN environment is collectively designed for the server 100, switch 1 (300A), switch 2 (300B) and the storage 200 using the SAN system construction aid apparatus 1. Concrete details are as follows.

A line (410A) meaning a physical line is drawn from port A (103) of the server 100 to port 0 (315A) of switch 1 (300A) on the screen displayed on the display of the SAN system construction aid apparatus 1. Also, a line (410C) meaning a physical line is drawn from port 7 (315C) of switch 1 (300A) to port C (205) of the storage 200.

A line (410B) meaning a physical line is drawn from port B (104) of the server 100 to port 4 (325B) of switch 2 (300B). Also, a line (410D) meaning a physical line is drawn from port 5 (325D) of switch 2 (300B) to port C (206) of the storage 200.

At that time, information of the WWN of each port of the server and the storage is unknown because there is no information of the actual system at the point of time when the system is designed. Therefore, a provisional WWN is set to each port of the server and the storage, and the provisional WWN is set to the port of the switch connected to each port of the server and the storage, and information physically connected is made.

Next, an in-storage logical configuration is made inside of the storage 200. First, a plurality of disks are selected to construct Raid. In FIG. 16, Raid (220) is constructed by disk 0 (210), disk 1 (211), disk 2 (212), disk 3 (213), and disk 4 (214). Then, the logical volume inside of the Raid (220) is divided, and LunV (Lun Volume) is made. In FIG. 16, the physical volume is divided into five volumes, LunV100 to LunV104.

Next, the mapping of the LunV which has been made and the Lun number which can be seen from the server are made. In FIG. 16, LunV100, LunV101 and LunV102 are mapped with Lun0, Lun1 and Lun 2 respectively. Then, each mapped Lun is allocated to each port.

FIG. 17 shows the state of the WWN of each port when the system is off-line designed in this working example. FIG. 17 consists of (from left to right) server device name, server FC port which is the information constituting the server device in a multiple environment, switch, storage FC port, and media information. When the instance of the server is off-line designed by a multi-path, if the instances 0 to 2 are constructed in the server, as shown in FIG. 17, the WWN information of the server FC port (port A, port B) and the WWN information of the storage FC port (port C. port D) are unknown, so provisional WWN information is set to each port of the server and the storage, as described above.

Next, when the user designates port A (103) of the server 100 and port C (205) of the storage 200, he makes zoning information in switch 1 (300A) as access path information using the WWN information which is provisionally set to port A and port C. Then, he loads the WWN information of the ports of the server and the storage to the ports of each other (provisional WWN information of port C is set to port A, and provisional WNN information of port A is set to port C). The same applies to port B and port D.

Then, the setting of the access path terminates. The user stores this setting information in the storage as an access path connection command file.

Also, an access path (AP5 in FIG. 16) between port A (103) and port C (205) is added to the SAN system configuration image displayed in the SAN system construction aid apparatus 1. The same applies to port B (104) AND PORT D (206). An access path (AP6 in FIG. 16) between port B (104) and port D (206) is added to the SAN system configuration image displayed in the SAN system construction aid apparatus 1.

Then, the setting of an access path when the system is of-line designed terminates. Thus, the system design which should be implemented in advance terminates. In short, system design is performed based on a virtual system, and system design is performed using the information of an actual apparatus as a provisional value, and the system design is stored.

WORKING EXAMPLE 2

In this working example, the physical connection of the actual system is implemented using the system design data made in working example 1 (access path connection command file) at an installation site (refer to FIG. 11).

Figure 18:
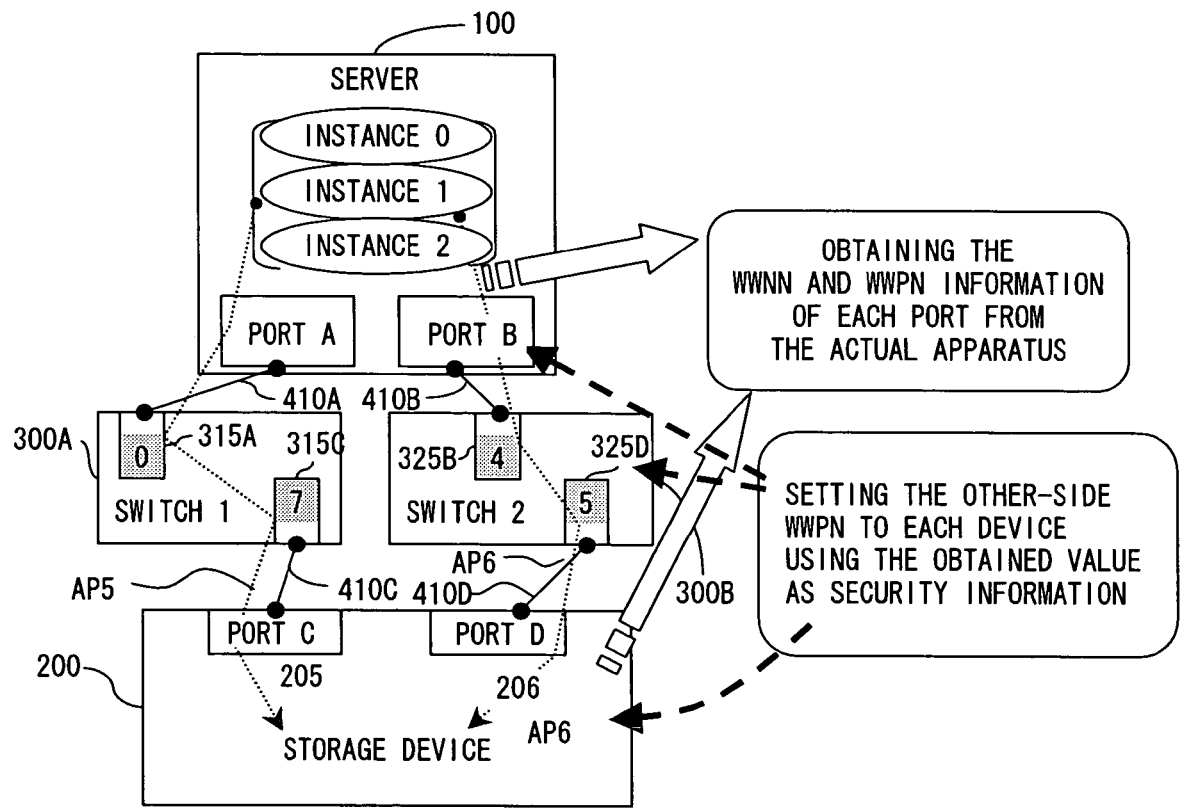
FIG. 18 shows the outline of the system to which the system design in working example 2 is reflected.

FIG. 18 shows the outline of this working example. The power source of each device constituting the system (server 100, switch (300A), switch (300B) and storage 200) is inputted, and the following processing is implemented.

The SAN system construction aid apparatus 1 obtains the WWN information of port A and port B from the server 100 via the LAN, and the WWN information of port C and port D from the storage 200, the WWN information of the other-side port connected to each port of switch 1 from switch 1, and the WWN information of the other-side port connected to each port of switch 2 from switch 2. Then, the access path connection command file stored in working example 1 is loaded, and the provisional WWN information of each port set to the access path connection command file and the WWN information of the other-side port as physical path setting information are changed to the actual WWN information which is obtained in the above procedure. After the change is made, this access path connection command file is stored.

After then, the SAN system construction aid apparatus 1 issues the access path connection command file. The access path of the SAN system is constructed by the automatic setting processing based on this access path connection command file.

Zoning information is set to the FC switches 300 and 300B. The SAN system construction aid apparatus 1 transmits zoning data (in the example shown in FIG. 18, data of zone A-C (WWN1, WWWN3) and zone B-D (WWM2, WWN4)), sets the zone regulating access from the server 100 to the storage 200 to the zoning mechanisms (not shown in any figure) of switch 1 (300A) and switch 2 (300B), and then, the setting of the access path (AP5, AP6) is implemented. And, the multi-path design from the instances in the server to the LUN in the storage can be completed.

Thus, the setting of all the paths of the instances in the server is implemented.

FIG. 19 shows that information from the instances in the server to the media in the storage is constructed by setting the WWN information of the server and the storage (with each other) as access information to the switches using the WWN information which is unknown when the system is off-line designed and by re-booting the server. In FIG. 17, WWN information in terms of port information of port A. port B, port C, and port D is unknown, but in FIG. 19, the WWN of each port is known ("port A: WWN1," "port B: WWN2," "port C: WWN3" and "port D: WWN4").

The access path can be controlled depending on how the WWN information of each port is set, so the WWN information can be used as security information.

Thus, port information (WWN) essential for the system design which has already been made is obtained for a real system, and various kinds of security information can be set to each device in accordance with the system design. Moreover, the reduction in system design time and the ease in setting a real system at an installation site can be realized. Also, the access path set when the system is designed can be reflected to each device under an actual SAN environment.

According to the present invention, it is made possible to make the configuration drawing of a virtual SAN system including a physical path and an access path using a computer, so a SAN system can be designed easily and efficiently.

After a SAN system is constructed based on the configuration drawing of the SAN system which is designed by a virtual SAN system, information concerning the physical path of the actual SAN system is obtained, and the physical path information and the information concerning the physical path set by the virtual SAN system are compared to judge the correct or the incorrect of the wiring of the actual SAN system, so it is possible to confirm the actual SAN system easily and promptly and to reduce the labor for the confirmation work and failures in the confirmation.

Moreover, it is possible to realize the reduction of system design time and the ease in setting a real system at an installation site.

What is claimed is:

1. A storage area network (SAN) construction aid apparatus in which at least one server having at least one fiber channel port, at least one storage having at least one fiber channel port, and at least one fiber channel switch having a plurality of fiber channel ports are connected by a plurality of fiber channels, comprising:
    a first information input device for inputting information concerning each device of the server, the storage and the fiber channel switch that configure the SAN;
    a device image display device for causing a display device to display an image indicating each device for which information is input;
    a second information input device for inputting, between the images of the devices displayed on the display device, provisional physical connection information indicating a provisional physical connection between the devices;
    a SAN configuration information storage device for storing virtual SAN configuration information that includes a configuration image of a virtual SAN configured by the provisional physical connection information and includes the provisional physical connection information based on the information inputted from the first and second information input devices;
    a third information input device for inputting, for the virtual SAN configuration image displayed on the display device, provisional logical connection information indicating a provisional logical connection between the devices;
    a provisional logical connection command creation device for creating a provisional logical connection command from the input provisional logical connection information;
    an actual physical connection information obtaining device for obtaining, via a network that is different from the SAN, actual physical connection information indicating an actual physical connection between the devices from each device of the server, the storage, and the fiber channel switch that constitute an actual SAN on the basis of the virtual SAN configuration information, when a first request is input;
    a SAN configuration confirmation device for confirming whether a physical connection relationship of the SAN which has been actually constructed conforms to the provisional physical connection information included in the virtual SAN configuration information, by comparing the obtained actual physical configuration information with the provisional physical connection information included in the stored virtual SAN configuration information;
    a confirmation result displaying device for highlighting an unconformed part of the physical connection relationship of the SAN on the basis of a confirmation result according to the SAN configuration confirmation device;
    an actual logical connection command creation device for creating an actual logical connection command by changing the provisional logical connection information in the provisional logical connection command into an actual logical connection information on the basis of the obtained actual physical connection information, when a second request is input; and
    an actual logical connection command issuing device for issuing the created actual logical connection command to each of the devices that configure the actual SAN, and for reflecting logical connection information set in the virtual SAN in the actual SAN, wherein
    the SAN configuration confirmation device obtains a world wide port name (WWPN) of the fiber channel port as the physical connection information from the fiber channel switch constituting the actual SAN, recognizes a device connected to the fiber channel switch on the basis of the obtained WWPN, and confirms on the basis of a result of the recognition, whether the physical connection relationship of the SAN which has been actually constructed conforms to the physical connection information included in the SAN configuration information.

2. A storage area network (SAN) construction aid method which uses a computer for constructing a storage area network in which at least one server having at least one fiber channel port, at least one storage having at least one fiber channel port, and at least one fiber channel switch having a plurality of fiber channel ports are connected by a plurality of fiber channels, comprising:

a first information input process of inputting information concerning each device of the server, the storage and the fiber channel switch that configure the SAN;

a display process of causing a display device to display an image indicating each device for which information is input;

a second information input process of inputting, between the images of the devices displayed on the display device, provisional physical connection information indicating a provisional physical connection between the devices;

a SAN configuration information storage process of storing virtual SAN configuration information that includes a configuration image of a virtual SAN configured by the provisional physical connection information and includes the provisional physical connection information based on the information inputted in the first and second information input processes;

a third information input process of inputting, for the virtual SAN configuration image displayed on the display device, provisional logical connection information indicating a provisional logical connection between the devices;

a provisional logical connection command creating process of creating a provisional logical connection command from the input provisional logical connection information;

an actual physical connection information obtaining process of obtaining, via a network that is different from the SAN, actual physical connection information indicating an actual physical connection between the devices from each device of the server, the storage, and the fiber channel switch that constitute an actual SAN on the basis of the virtual SAN configuration information, when a first request is input;

a SAN configuration confirmation process of confirming whether a physical connection relationship of the SAN which has been actually constructed conforms to the provisional physical connection information included in the virtual SAN configuration information, by comparing the obtained actual physical configuration information with the provisional physical connection information included in the stored virtual SAN configuration information;

a confirmation result displaying process of highlighting an unconformed part of the physical connection relationship of the SAN on the basis of a confirmation result according to the SAN configuration confirmation process;

an actual logical connection command creation process of creating an actual logical connection command by changing the provisional logical connection information in the provisional logical connection command into an actual logical connection information on the basis of the obtained actual physical connection information, when a second request is input; and an actual logical connection command issuing processing of issuing the created actual logical connection command to each of the devices that configure the actual SAN, and for reflecting logical connection information set in the virtual SAN in the actual SAN, wherein the SAN configuration confirmation process obtains a world wide port name (WWPN) of the fiber channel Port as the physical connection information from the fiber channel switch constituting the actual SAN, recognizes a device connected to the fiber channel switch on the basis of the obtained WWPN, and confirms on the basis of a result of the recognition, whether the physical connection relationship of the SAN which has been actually constructed conforms to the physical connection information included in the SAN configuration information.

3. A computer readable medium for controlling a computer and for constructing a storage area network (SAN) in which at least one server having at least one fiber channel port, at least one storage having at least one fiber channel port, and at least one fiber channel switch having a plurality of fiber channel ports are connected by a plurality of fiber channels, said medium having stored thereon a process executed by a computer comprising:

a first information input process of inputting information concerning each device of the server, the storage and the fiber channel switch that configure the SAN;

a device image display process of causing a display device to display an image indicating each device for which information is input;

a second information input process of inputting, between the images of the devices displayed on the display device, provisional physical connection information indicating a provisional physical connection between the devices;

a SAN configuration information storage process of storing virtual SAN configuration information that includes a configuration image of a virtual SAN configured by the provisional physical connection information and includes the provisional physical connection information based on the information inputted from the first and second information input processes;

a third information input process of inputting, for the virtual SAN configuration image displayed on the display device, provisional logical connection information indicating a provisional logical connection between the devices;

a provisional logical connection command creation process of creating a provisional logical connection command from the input provisional logical connection information;

an actual physical connection information obtaining process of obtaining, via a network that is different from the SAN, actual physical connection information indicating an actual physical connection between the devices from each device of the server, the storage, and the fiber channel switch that constitute an actual SAN on the basis of the virtual SAN configuration information, when a first request is input;

a SAN configuration confirmation process of confirming whether a physical connection relationship of the SAN which has been actually constructed conforms to the provisional physical connection information included in the virtual SAN configuration information, by comparing the obtained actual physical configuration information with the provisional physical connection information included in the stored virtual SAN configuration information;

a confirmation result displaying process of highlighting an unconformed part of the physical connection relationship of the SAN on the basis of a confirmation result according to the SAN configuration confirmation process;

an actual logical connection command creation process of creating an actual logical connection command by changing the provisional logical connection information in the provisional logical connection command into an actual logical connection information on the basis of the obtained actual physical connection information, when a second request is input; and an actual logical connection command issuing process of issuing the created actual logical connection command to each of the devices that configure the actual SAN, and for reflecting logical connection information set in the virtual SAN in the actual SAN, wherein the SAN configuration confirmation process obtains a world wide port name (WWPN) of the fiber channel port as the physical connection information from the fiber channel switch constituting the actual SAN, recognizes a device connected to the fiber channel switch on the basis of the obtained WWPN, and confirms on the basis of a result of the recognition, whether the physical connection relationship of the SAN which has been actually constructed conforms to the physical connection information included in the SAN configuration information.

4. A storage area network (SAN) construction aid apparatus in which at least one server having at least one fiber channel port, at least one storage having at least one fiber channel port, and at least one fiber channel switch having a plurality of fiber channel ports are connected by a plurality of fiber channels, comprising:

a first information input means for inputting information concerning each device of the server, the storage and the fiber channel switch that configure the SAN;

a device image device means for causing a display device to display an image indicating each device for which information is input;

a second information input means for inputting, between the images of the devices displayed on the display device, provisional physical connection information indicating a provisional physical connection between the devices;

a SAN configuration information storage means for storing virtual SAN configuration information that includes a configuration image of a virtual SAN configured by the provisional physical connection information and includes the provisional physical connection information based on the information inputted from the first and second information input means;

a third information input means for inputting, for the virtual SAN configuration image displayed on the display device, provisional logical connection information indicating a provisional logical connection between the devices;

a provisional logical connection command creation means for creating a provisional logical connection command from the input provisional logical connection information;

an actual physical connection information obtaining means for obtaining, via a network that is different from the SAN, actual physical connection information indicating an actual physical connection between the devices from each device of the server, the storage, and the fiber channel switch that constitute an actual SAN on the basis of the virtual SAN configuration information, when a first request is input;

a SAN confirmation means for confirming whether a physical connection relationship of the SAN which has been actually constructed conforms to the provisional physical connection information included in the virtual SAN configuration information, by comparing the obtained actual physical configuration information with the provisional physical connection information included in the stored virtual SAN configuration information;

a confirmation result displaying means for highlighting an unconformed part of the physical connection relationship of the SAN on the basis of a confirmation result according to the SAN configuration confirmation means;

an actual logical connection command creation means for creating an actual logical connection command by changing the provisional logical connection information in the provisional logical connection command into an actual logical connection information on the basis of the obtained actual physical connection information, when a second request is input; and an actual logical connection command issuing means for issuing the created actual logical connection command to each of the devices that configure the actual SAN, and for reflecting logical connection information set in the virtual SAN in the actual SAN, wherein the SAN configuration confirmation means obtains a world wide Port name (WWPN) of the fiber channel port as the physical connection information from the fiber channel switch constituting the actual SAN, recognizes a device connected to the fiber channel switch on the basis of the obtained WWPN, and confirms on the basis of a result of the recognition, whether the physical connection relationship of the SAN which has been actually constructed conforms to the physical connection information included in the SAN configuration information.

5. A storage area network (SAN) construction aid apparatus for constructing a storage area network which comprises a first apparatus having at least one fiber channel port, a second apparatus having at least one fiber channel port, and a fiber channel connecting the fiber channel port which the first apparatus has and the fiber channel port which the second apparatus has, further comprising:

a first information input means for inputting information concerning the first apparatus and the second apparatus that configure the SAN;

a device image display means for causing a display device to display an image indicating each apparatus for which information is input;

a second information input means for inputting, between the images of the apparatuses displayed on the display device, provisional physical connection information indicating a provisional physical connection between the apparatuses;

a SAN configuration information storage means for storing virtual SAN configuration information that includes a configuration image of a virtual SAN configured by the provisional physical connection information and includes the provisional physical connection information based on the information inputted from the first and second information input means;

a third information input means for inputting, for the virtual SAN configuration image displayed on the display device, provisional logical connection information indicating a provisional logical connection between the first and second apparatus;

a provisional logical connection command creation means for creating a provisional logical connection command from the input provisional logical connection information;

an actual physical connection information obtaining means for obtaining, via a network that is different from the SAN, actual physical connection information indicating an actual physical connection by the fiber channel between the fiber channel port of the first apparatus and the fiber channel port of the second apparatus that constitute an actual SAN on the basis of the virtual SAN configuration information, when a first request is input;

a SAN configuration confirmation means for confirming whether a physical connection relationship of the SAN which has been actually constructed conforms to the provisional physical connection information included in the virtual SAN configuration information, by comparing the obtained actual physical configuration information with the provisional physical connection information included in the stored virtual SAN configuration information;

a confirmation result displaying means for highlighting an unconformed part of the physical connection relationship of the SAN on the basis of a confirmation result according to the SAN configuration confirmation means;

an actual logical connection command creation means for creating an actual logical connection command by changing the provisional logical connection information in the provisional logical connection command into an actual logical connection information on the basis of the obtained actual physical connection information, when a second request is input; and an actual logical connection command issuing means for issuing the created actual logical connection command to the first and second apparatus that configure the actual SAN, and for reflecting logical connection information set in the virtual SAN in the actual SAN, wherein the SAN configuration confirmation means obtains a world wide port name (WWPN) of the fiber channel port as the physical connection information from the fiber channel switch constituting the actual SAN, recognizes a device connected to the fiber channel switch on the basis of the obtained WWPN, and confirms on the basis of a result of the recognition, whether the physical connection relationship of the SAN which has been actually constructed conforms to the physical connection information included in the SAN configuration information.

* * * * *

UNITED STATES PATENT AND TRADEMARK OFFICE
CERTIFICATE OF CORRECTION

PATENT NO.       : 7,752,295 B2                                    Page 1 of 1
APPLICATION NO.  : 10/952763
DATED            : July 6, 2010
INVENTOR(S)      : Sachiko Terai et al.

It is certified that error appears in the above-identified patent and that said Letters Patent is hereby corrected as shown below:

Column 24, Line 2, delete "Port" and insert -- port --, therefor.

Column 26, Line 24, delete "Port" and insert -- port --, therefor.

Signed and Sealed this

Twenty-third Day of November, 2010

David J. Kappos
*Director of the United States Patent and Trademark Office*